United States Patent
Miyake

(10) Patent No.: US 6,415,065 B1
(45) Date of Patent: *Jul. 2, 2002

(54) IMAGE PROCESSING APPARATUS AND METHOD THEREFOR

(75) Inventor: Nobutaka Miyake, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/691,588

(22) Filed: Aug. 2, 1996

(30) Foreign Application Priority Data

Aug. 4, 1995 (JP) .............................. 7-199663
Nov. 6, 1995 (JP) .............................. 7-287270
Mar. 26, 1996 (JP) ............................ 8-070069

(51) Int. Cl.$^7$ .............................................. G06K 9/32
(52) U.S. Cl. ................. 382/300; 382/167; 382/251; 382/274; 358/457; 358/518; 358/520; 358/525
(58) Field of Search ............................. 382/162, 164, 382/167, 274, 261, 299, 251; 348/255, 453, 358, 518; 358/515, 518, 520, 525, 539, 300, 457

(56) References Cited

U.S. PATENT DOCUMENTS

| | | | | |
|---|---|---|---|---|
| 4,460,924 A | * | 7/1984 | Lippel | 348/471 |
| 4,857,927 A | * | 8/1989 | Takabayashi | 341/144 |
| 4,941,038 A | * | 7/1990 | Walowit | 358/75 |
| 5,121,196 A | * | 6/1992 | Hug | 358/75 |
| 5,185,661 A | * | 2/1993 | Ng | 358/75 |
| 5,200,816 A | * | 4/1993 | Rose | 358/75 |
| 5,208,871 A | * | 5/1993 | Eschbach | 382/41 |
| 5,233,412 A | * | 8/1993 | Nishihara | 358/500 |
| 5,285,297 A | * | 2/1994 | Rose et al. | 358/530 |
| 5,311,332 A | * | 5/1994 | Imao et al. | 358/80 |
| 5,317,426 A | * | 5/1994 | Hoshino | 358/78 |
| 5,321,797 A | * | 6/1994 | Morton | 395/127 |
| 5,351,048 A | * | 9/1994 | Yamasaki | 341/143 |
| 5,363,218 A | * | 11/1994 | Hoshino | 358/80 |
| 5,424,755 A | * | 6/1995 | Lucas et al. | 340/703 |
| 5,428,465 A | * | 6/1995 | Kananiori et al. | 358/525 |
| 5,436,739 A | * | 7/1995 | Imao et al. | 358/518 |
| 5,497,154 A | * | 3/1996 | Komamura | 341/131 |
| 5,577,136 A | * | 11/1996 | Tanioka et al. | 382/270 |
| 5,627,916 A | * | 5/1997 | Horiuchi | 382/239 |
| 5,664,072 A | * | 9/1997 | Ueda et al. | 358/504 |
| 5,764,795 A | * | 6/1998 | Takeo et al. | 358/518 |
| 5,777,599 A | * | 7/1998 | Poduska, Jr. | 340/728 |

FOREIGN PATENT DOCUMENTS

| | | |
|---|---|---|
| JP | 63-2669 | 1/1988 |
| JP | 7-30772 | 1/1995 |

* cited by examiner

*Primary Examiner*—Leo Boudreau
*Assistant Examiner*—Sheela Chawan
(74) *Attorney, Agent, or Firm*—Fitzpatrick, Cella, Harper & Scinto

(57) ABSTRACT

An image processing apparatus for effecting image processing by N-point interpolation, utilizing lattice points stored in a table corresponding to image data, includes input unit for entering image data, and interpolation unit for effecting an interpolation process employing, according to the image data, lattice points not exceeding N points and including a lattice point outside an interpolating solid represented by N lattice points where the image data is located.

10 Claims, 21 Drawing Sheets

$x : (1-x) = 1 : 3$
$y : (1-y) = 1 : 3$
$z : (1-z) = 1 : 3$

| LATTICE POINT | INTERPOLATION RATE | INTERPOLATION COEFFICIENT |
|---|---|---|
| a | 27 | 30 |
| b | 9 | 12 |
| c | 9 | 11 |
| d | 3 | 0 |
| e | 9 | 11 |
| f | 3 | 0 |
| g | 3 | 0 |
| h | 1 | 0 |
| TOTAL | 64 | 64 |

$x : (1-x) = 1 : 3$
$y : (1-y) = 1 : 3$
$z : (1-z) = 1 : 3$

| LATTICE POINT | RATE | RATE OF THE NUMBER OF PIXELS | THE NUMBER OF GENERATED PIXELS |
|---|---|---|---|
| a | 27 | 6.75 | 7 |
| b | 9 | 2.25 | 2 |
| c | 9 | 2.25 | 2 |
| d | 3 | 0.75 | 1 |
| e | 9 | 2.25 | 2 |
| f | 3 | 0.75 | 1 |
| g | 3 | 0.75 | 1 |
| h | 1 | 0.25 | 0 |
| TOTAL | 64 | 16 | 16 |

$(f(a), f(a), f(a), f(a), f(a), f(b), f(c), f(d), f(e), f(e), f(f), f(g))$

IMAGE PROCESSING APPARATUS AND METHOD THEREFOR

BACKGROUND OF THE INVENTION

1. Field of the Invention

The present invention relates to an image processing apparatus effecting color processing with tables, and a method therefor.

2. Related Background Art

There have been proposed various color conversion technologies, in the output of color information entered for example from an image input device to a color printer or the like, for converting such color information from a device-in-dependent color space into device-dependent color components specific to the color printer. The color components entered from the image input device are three components of red (R), green (G) and blue (B), while the output color components are cyan (C), magenta (M) and yellow (Y) specific to the coloring materials in the printer. If the black color cannot be represented with these three colors, the representation is made with four colors including black (K). The conventional signal flow from the RGB input signals to the CMYK output signals is shown in FIG. 25. The input color component signals may be RGB signals based on the NTSC or PAL standards, or can also be L*a*b* signals based on the uniform color space. Means 201 for logarithmic conversion and gamma correction prepared CMY complementary color components by logarithmic conversion. (The CMY components prepared in this step are represented by C0, M0, Y0 respectively.) Then means 202 effects undercolor removal (UCR) and black generation to obtain a black (K) component. Then masking means 203 effects conversion to a device-dependent color space, matching the coloring materials specific to the printer. For this conversion, there has been proposed a method of calculating the conversion coefficients, utilizing a black box model. The equations for this conversion can be, for example, linear ones utilizing a 3×3 conversion matrix or non-linear ones involving higher-order terms for improving the precision.

There is also conceived a configuration including a K term in the input of the masking means, or a configuration including the UCR itself in the masking means. Output gamma correction means 204 corrects the four color components according to the characteristics of the printer. Pseudo gradation process means 205 effects a pseudo gradation process according to the number of levels generatable by the printer, and the obtained image data are transmitted to a printer engine and printed therein.

In the conventional configuration shown in FIG. 25, there has been explained conversion means employing linear or non-linear approximation, but, in recent years, there is being principally employed methods utilizing three-dimensional color correction table for more precise conversion. For example the Japanese Patent Laid-Open Application No. 63-2669 proposes a color conversion method by so-called direct mapping, utilizing a color correction table based on all the combinations. Also there have long been proposed various methods of preparing a table with quantized lattice points of a limited number, instead of preparing all the combinations, and effecting color conversion for the input value other than the lattice points by an interpolating calculation. As an simplest example, there will be explained interpolation by 8 vertices of a cube, with reference to FIG. 26, showing the method of interpolation for an input point i, based on vertices a–h of a cube, contained in the lattice points stored in the table. The table contains the conversion information f for these vertices (f(a) to f(h) for the points a–h), the value g(e) of the point e after conversion is given by:

$$g(e)=(1-x)(1-y)(1-z)f(a)+x(1-y)(1-z)f(b)+(1-x)(1-y)zf(c)+x(1-y)zf(d)+(1-x)\,y(1-z)f(e)+xy(1-z)f(f)+(1-x)yzf(g)+xyzf(h)$$

This method can achieve desired color conversion in easy manner with a limited table capacity, by linear approximation with lattice points constituting a cube.

Also as another conventional example, the Japanese Patent Laid-Open Application No. 7-30772 proposes a pseudo color conversion without interpolation, by a pseudo gradation process. This method utilizes two levels of pseudo gradation process, wherein a gradation level pre-conversion effects pseudo gradation process for converting into the coordinates of optimum lattice points, in order to eliminate the input values other than the lattice points of color conversion, and a gradation level post-conversion effects quantization matching the printer, again by a pseudo gradation process. This method is based on a concept that the image quality is not affected by the limitation of the number of gradation levels by the pseudo gradation process in the pre-conversion, if a rough quantization (for example binarization) is conducted in the post conversion.

However the conventional methods explained above are associated with the following drawbacks. The color conversion process is often executed in a printer driver software on the host computer, in case of the color ink jet printer, the melting thermal transfer printer or the sublimation thermal transfer printer. With the recent improvement in the resolution of the printer engine, the number of pixels to be processed has significantly increased, so that the printer driver software requires a long process time. For this reason it is strongly desired to reduce the process time as far as possible, without deteriorating the precision of the color conversion process. In the aforementioned conventional method of calculating the corrosion value between the lattice points by interpolation, the calculation of a point g(e) requires 24 multiplications and 7 additions, leading to an enormous process time.

Also the method of the Japanese Patent Laid-Open Application No. 7-30772, employing the gradation level pre-conversion for eliminating the input values other than the lattice points prior to the input of the lattice points by the pseudo gradation process, is faster than the interpolation mentioned above, but, unless a large number of quantization levels is selected after the pre-conversion, generates a pseudo contour in the stage of pre-conversion, so that the image quality remains deteriorated also in the post-conversion. A large number of quantization levels after the pre-conversion leads to a larger table capacity, thereby increasing the load on the memory in the host computer or a longer time for the address search for such large-capacity table.

Also for a printer engine of a higher resolution, there can be conceived, for reducing the number of pixels to be processed, a method of reducing the input resolution and effecting image expansion after the color conversion, or a method of effecting an expansion at the binarization for conversion into the output resolution. In the above-explained configuration, the color conversion has to be more precise, as the resolution at the color conversion becomes lower. The image quality and the speed or the table capacity are mutually contracting requirements, and there has not been known a color conversion process satisfying all these conditions.

The foregoing conventional methods are also associated with the following drawbacks. As an example, there is considered a system in which the input resolution is different from the output resolution. The output resolution of the printers is increasing year after year, but, if the input resolution is matched with such increasing output resolution, there will result various difficulties such as the load for the preparation and processing of the image information on the host computer, the load for the color conversion and the pseudo gradation process in the printer driver, and the load of transfer time of the image information from the printer driver to the printer. It is therefore conceived a configuration of entering the information with a low resolution, thereby alleviating the load of image processing, and preparing and releasing the image information of a high resolution matching the printer engine.

The color conversion is often executed in the printer driver of the host computer, in case of the color ink jet printer, the melting thermal transfer printer or the sublimation thermal transfer printer. In such case, the color conversion is preferably executed in a low resolution state, in order to reduce the execution time. The aforementioned conventional method of calculating the correction value between the lattice points by interpolation requires 24 multiplications and 7 additions for calculating a point g(e), thus requiring an extremely long process time even if conducted with a low resolution. Also the method disclosed in the Japanese Patent Laid-Open Application No. 7-30772, of effecting pre-conversion of gradation for eliminating non-lattice input values prior to the lattice point input by pseudo gradation process is faster, but the image quality becomes deteriorated in comparison with the case of processing in the same image size, since the number of pixels required in the pseudo gradation eventually increases by the expansion process after the color conversion. If these situations are explained with reference to FIG. 26, the former method obtains g(e) by calculation but the calculated g(e) may be expanded to cover plural pixels, while, in the latter method, f(a) or f(b) may be expanded to cover plural pixels.

In these methods, it is also possible to effect image expansion for example by 0-th order interpolation prior to the color conversion, but such configuration in the former method will significantly increase the process time without improvement in the image quality, and, in the latter method, will provide certain improvement in the image quality without possibility of fine control and also will result in a significant increase in the process time.

SUMMARY OF THE INVENTION

The present invention, attained in consideration of the foregoing has the following objects.

An object of the present invention is to enable satisfactory image processing at a very high speed.

The above-mentioned object can be attained, according to an embodiment of the present invention, by an image processing apparatus for effecting image processing by N-point interpolation, utilizing lattice points stored in a table corresponding to image data, comprising:

input means for entering image data; and interpolation means for effecting an interpolation process employing, according to said image data, lattice points not exceeding N points and including a lattice point outside an interpolating space represented by N lattice points where said image data are located.

According to the present invention there is also provided an image processing apparatus for effecting image processing with a table, comprising:

storage means for storing a table composed of data of plural lattice points indicating the relationship between input and output image data;

input means for entering image data;

first selection means for selecting, based on said input image data, data of M lattice points among the lattice point data stored in said table;

second selection means for selecting, based on relative positions of said image data with respect to each of said M lattice points, the data of N lattice points (N<M) among those of said M lattice points; and interpolation means for effecting an interpolation based on the data of said N lattice points, thereby determining output image data corresponding to said input image data.

Another object of the present invention is to enable high-speed image processing with a high precision of approximation.

The above-mentioned object can be attained, according to the present invention, by an image processing apparatus for effecting image processing with a table, comprising:

storage means for storing a table composed of data of plural lattice points indicating the relationship between input and output image data;

input means for entering image data;

lattice point data selection means for selecting data of lattice points of a predetermined number, based on said input image data, among the data of plural lattice points stored in said table;

calculation means for newly calculating plural data, from said selected data of the plural lattice points; and output means for selecting, among said calculated plural data, those approximating said input image data and releasing output image data corresponding to said approximate calculated data.

Still another object of the present invention is to improve the precision of interpolation process with a simple configuration.

The above-mentioned object can be attained, according to the present invention, by an image processing apparatus comprising:

input means for entering image data;

addition means for adding a dither signal to said image data; and interpolation means for effecting N-point interpolation, utilizing a unique interpolating space based on lattice points stored in a table corresponding to the image data with said added dither signal.

According to the present invention there is also provided an image processing apparatus comprising:

addition means for entering image information of plural color components with A bits for each color and adding a dither signal to each color component of said input image information;

quantizing means for quantizing each of the color components of said input image information with the added dither signal into M bits;

a conversion table for converting each quantized point into a quantization correction value after a color processing;

approximation means for approximating the relative position of the input point, based on N-bit information ($N \leq A-M$) of each color component, before elimination by said quantizing means;

calculation means for calculating corrected conversion information for the input information, based on said quantization correction value released from said conversion table.

Still another object of the present invention is to enable satisfactory conversion of resolution at a high speed.

The above-mentioned object can be attained, according to the present invention, by an image processing apparatus for effecting color correction and resolution conversion on input image data, comprising:

a table containing combinations of input image data and output image data after said color correction, for plural lattice points;

color correction means for releasing output image data corresponding to said plural lattice points, based on said input image data, by referring to said table; and setting means for setting a number of generation of each of said output image data, based on said input image data.

According to the present invention there is also provided an image processing apparatus for entering image information composed of plural color components with n gradation levels in each color component and effecting a conversion into image information of which the number of pixels is increased to (A×B) times of the plural color components, matching the color reproduction characteristics of an image output device, comprising:

quantizing means for quantizing each of the color components of the input information;

a conversion table for converting each quantization point into a correction value matching the color reproduction characteristics of the image output device;

determination means for determining the number of generated pixels of the quantization point to be generated in the (A×B) pixels, based on the information of lower bits of each color component, eliminated by said quantization means;

gradation process means for reducing the number of gradation levels of the quantization correction value, released from said conversion table, to m levels (n<m) by a pseudo gradation process, based on the number of generated pixels determined by said determination means; and disposition means for positioning the pixels of m gradation levels after processing, within (A×B) pixels.

Still other objects of the present invention, and the features thereof, will become fully apparent from the following detailed description, which is to be taken in conjunction with the attached drawings.

DESCRIPTION OF THE PREFERRED EMBODIMENTS

Figure 11:
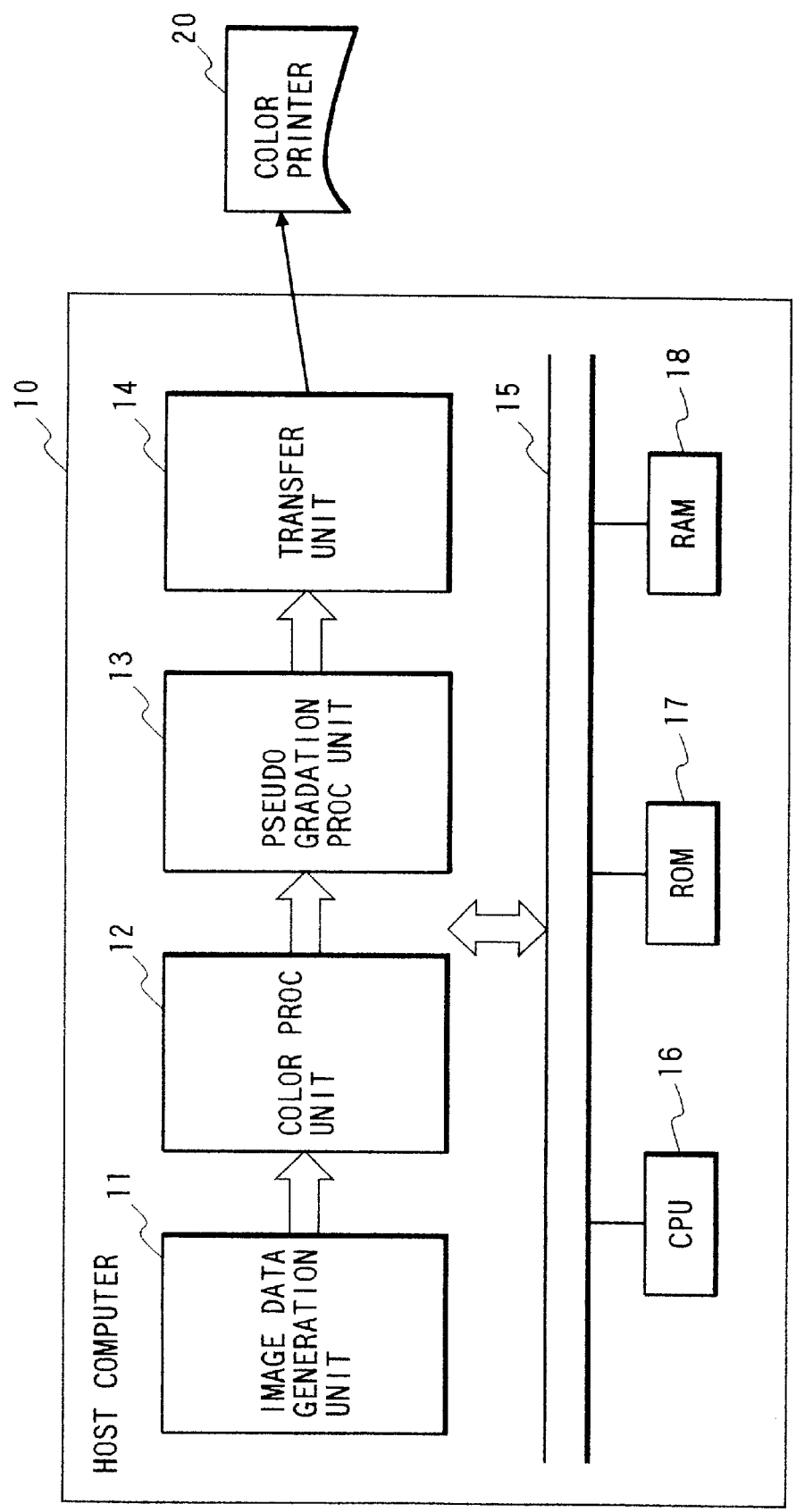
FIG. 11 is a schematic view showing an example of the system of the present invention.
Figure 12:
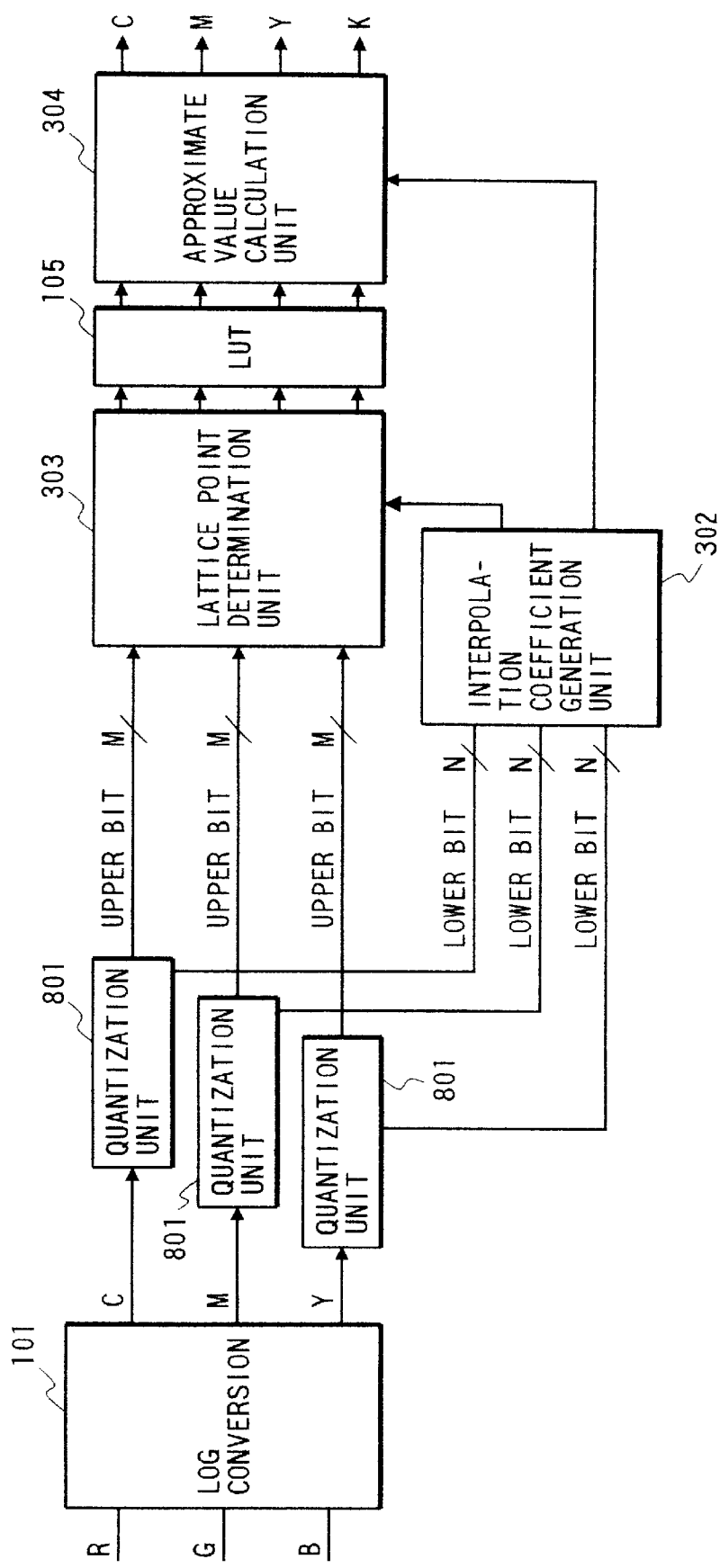
FIG. 12 is a schematic block diagram of an embodiment 3.

An example of the system of the present invention is schematically shown in a block diagram in FIG. 11. The system is composed of a host computer 10 and a color printer 20.

An image data generation unit 11 generates an original image for example by a DTP software, used by the user. A color process unit 12 converts the generated RGBM values into $C_1M_1Y_1K_1M$ values dependent on the printer device and determined in consideration of the ink characteristics etc. of the color printer 20. A pseudo gradation process unit 13 effects a pseudo gradation process on $C_2M_2Y_2K_2M$ values subjected to color processing, thereby converting into N values (N<M) that can be used for image formation in the recording unit of the color printer 20. The pseudo gradation process can be, for example, the density-conserved error diffusion method or the dither method. A transfer unit 14 transfers the $C_2M_2Y_2K_2N$ values in synchronization with the process in the color printer 20.

The above-mentioned units are controlled by a CPU 16 connected through a CPU bus 15. The CPU 16 controls the various units based on a program stored in a ROM 17, utilizing a RAM 18 as a work memory.

The color printer 20 drives CMYK color heads based on the received $C_2M_2Y_2K_2N$ values, thereby forming an image on a recording medium.

In the present system, the number of gradation levels reproducible by the head of the color printer 20 in a pixel is limited to N.

In order to reproduce the color of the original with a high quality in the color printer 20, the pseudo gradation process with plural pixels is applied to the $C_2M_2Y_2K_2N$ values.

In the following the color process unit 12 of the present invention will be explained further in embodiments.

Embodiment 1

Figure 1:
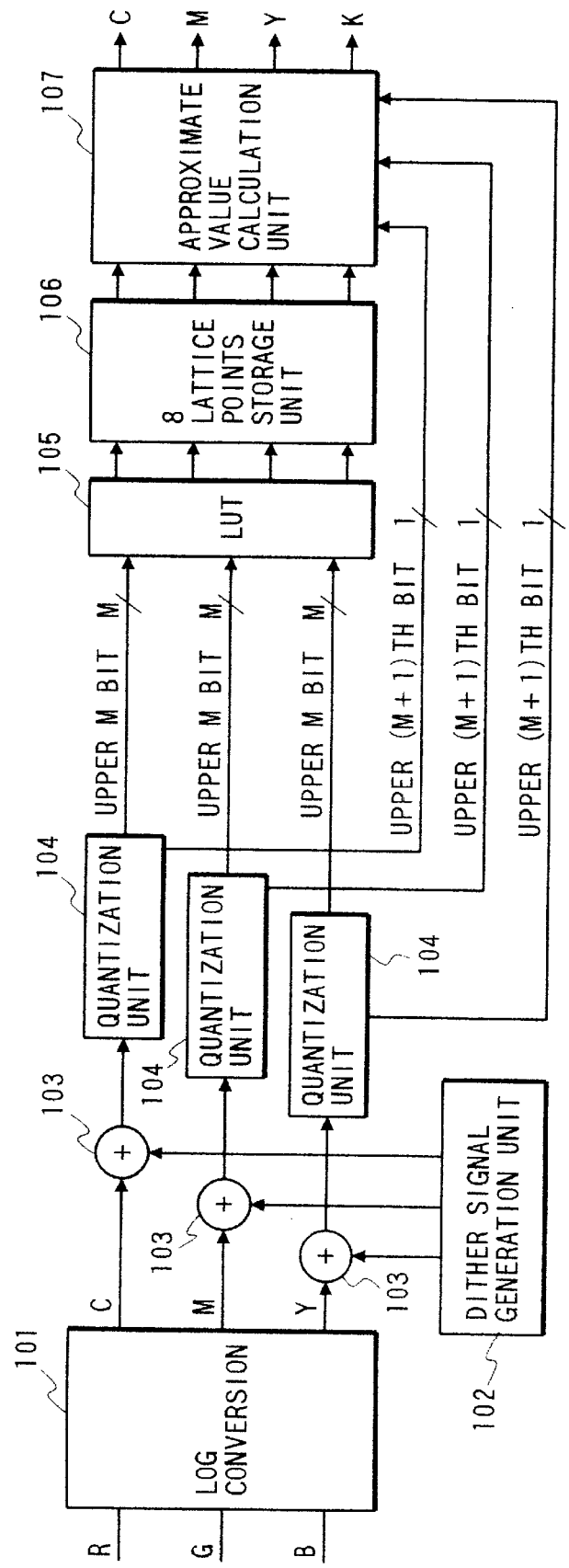
FIG. 1 is a schematic block diagram of an embodiment 1.

FIG. 1 is a schematic block diagram of an embodiment 1 of the present invention, wherein 24-bit RGB input information not dependent on the device is converted into 32-bit CMYK information dependent on the printer device. Logarithmic conversion means 101 effects logarithmic conversion on the RGB information to generate complementary color (CMYK) information which is naturally device-independent. In this operation there may also be conducted gamma correction as in the conventional configuration shown in FIG. 2. A dither signal, generated by a dither signal generation unit 102, is added in an adder 103 to each of thus prepared CMYK signals. The dither signals to be added may be same for different colors, but are preferably three-dimensional dither signals different in the CMY axes. More specifically, for an original signal in the color solid, the former dither signals are on a straight line regardless of the magnitude of the dither signals, but the latter dither signals are dispersed in the three-dimensional space. Each dither-added signal (signal after dither signal addition) is clipped into an 8-bit length and supplied to a quantization unit 104, which masks the dither-added signal except for upper M bits ($1 \leq M < 7$) thereby obtaining information of M bits, or M×3 bits for CMY colors. The dither signal generation unit 102 is provided with a dither matrix having an addition value for each pixel in a predetermined area corresponding to plural pixels, and generates a dither addition signal corresponding to the position of the input image-data. The value M is preferably determined experimentally, based on the table capacity storable in the host computer, image quality, processing speed etc. An LUT (look-up table) 105 stores, as in the conventional configuration CMYK correction values matching the color reproduction characteristics specific to the output device, for each quantization point.

The LUT 105 requires an address capacity of about $((2^M+1)^3)$, wherein $a^b$ means a to the power of b.

Figure 2:
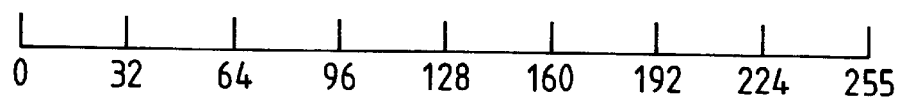
FIG. 2 is a view showing a first quantization.

As an example there will be explained a case of M=3. In this case, since each color is divided into 3 bits, there are obtained 8 states in total. Since interpolation requires correction values on both sides of each state, there are required 9 correction values (number of states +1). FIG. 2 shows an example of one-dimensional division. Since M=3, the step of quantization is 5 bits, and a correction value is assigned also for the maximum value "255" for the 8-bit signal. Since 9 correction values are stored for one dimension, those for 729 colors ($9^3$) for three dimensions.

Based on the LUT 105, there is identified one of the cubes divided in the color solid, to which the entered information of M×3 bits. The number of divided cubes coincides with the number of states, and the cube identified as object is hereinafter called the matching cube. The LUT 105 releases the correction values, required for interpolation, of 8 lattice points constituting the vertices of the matching cube, and these correction values are stored in the 8-lattice point storage unit 106.

On the other hand, among the lower bits masked in the quantization unit, the (M+1)-th bit from the top for each color, or 3 bits in total, are used for identifying the relative position within the cube for which the correction values are stored. An approximate value calculation unit 107 calculates the correction value for the target pixel, based on the correction values corresponding to the 8 lattice points of the matching cube and indicating the absolute position, and the above-mentioned 3-bit information indicating the relative position within the cube.

The process of the approximate value calculation unit 107, featuring the present embodiment, will be explained with reference to flow charts shown in FIGS. 3 and 4.

Figure 3:
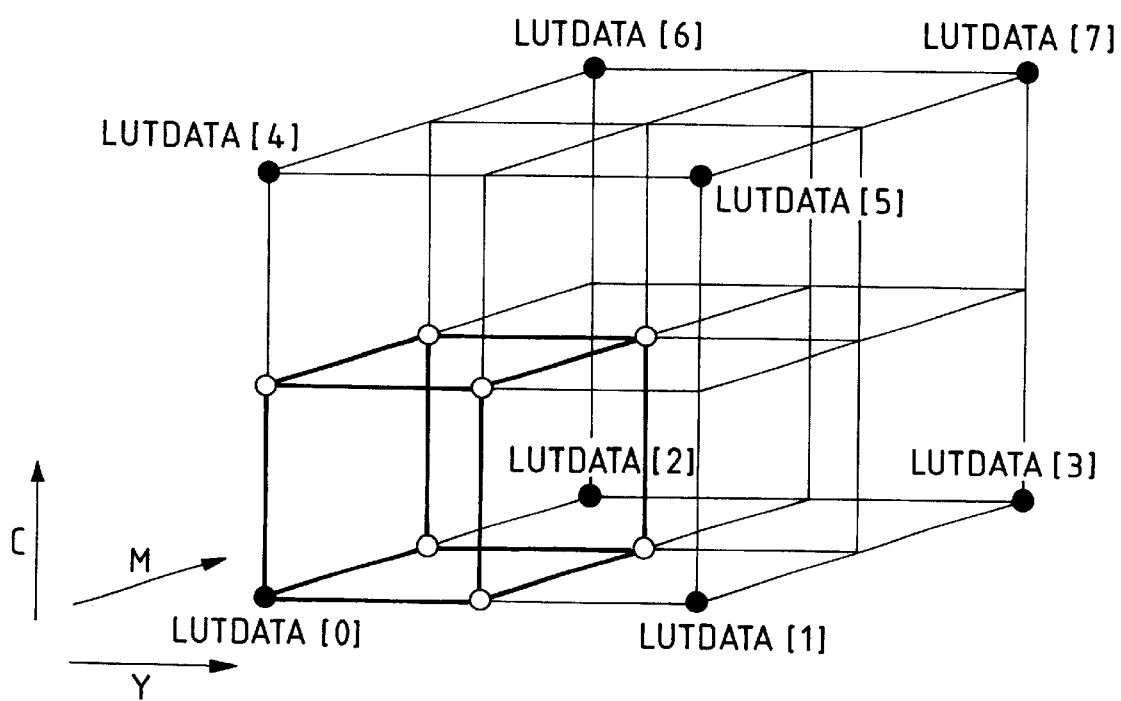
FIG. 3 is a view showing a cube applicable in the embodiment 1.

In FIG. 3, the largest cube indicates the matching cube. The vertices marked with ● are those of the matching cube, and each vertex has a correction value for conversion from a device-independent color space into a device-dependent color space. The correction value at each vertex is indicated by LUTDATA[i] ($0 \leq I < 7$). Each vertex marked with ○ is a point to be interpolated from the correction values of the points with ●, and the cube composed of the points ○ is called an interpolating cube. The concept of this conventional method is, in order to achieve high-speed color conversion, to effect interpolation only on relative positions allowing high-speed calculation and to employ pseudo gradation on other relative positions thereby approximating to the first-mentioned relative positions. Consequently the vertices of the interpolating cube alone are subjected to the interpolation.

Figure 4:
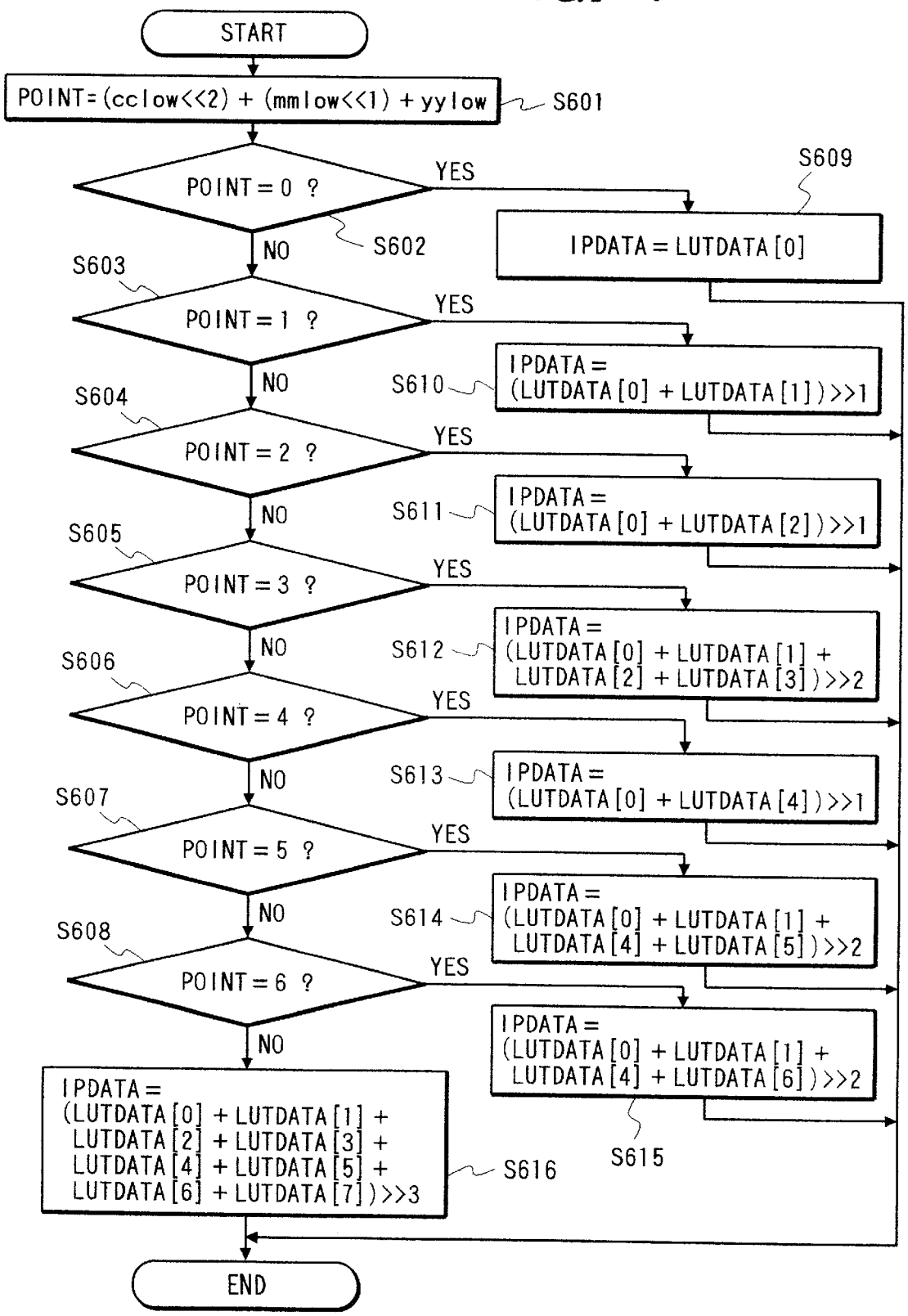
FIG. 4 is a flow chart showing the control sequence for approximate value calculation in the embodiment 1.

Now reference is made to a flow chart in FIG. 4. A step S601 calculates the relative position in the matching cube. The relative position is represented by a variable "point". Also the 1-bit information in the (M+1)-th bit in each color is represented by clow for the C component, mlow for the M component, and ylow for the Y component. In the step S601, these information is handled as 3-bit information, with the C, M and Y components respectively in the 3rd, 2nd and 1st bits. Steps S602 to S608 identify the values of the "point" variables of the 3-bit information and execute an interpolation according to the relative position.

If the result of the step S602 is YES, the correction value IPDATA to be interpolated is equal to LUTDATA[0], so that there is set IPDATA=LUTDATA[0] (S609).

If the result of the step S603 is YES, the relative position is between LUTDATA[0] and LUTDATA[1], so that there is set IPDATA=(LUTDATA[0]+LUTDATA[1])>>1 (wherein >>n indicates a rightward n-bit shift, equivalent to $1/(2^n)$) (S610).

If the result of the step S604 is YES, the relative position is between LUTDATA[0] and LUTDATA[2], so that there is set IPDATA=(LUTDATA[0]+LUTDATA[2])>>1 (S611).

If the result of the step S605 is YES, the relative position is equally distanced from four points LUTDATA[0], LUTDATA[1], LUTDATA[2] and LUTDATA[3], so that there is set IPDATA=LUTDATA[0]+LUTDATA[1]+LUTDATA[2]+LUTDATA[3]>>2 (S612).

If the result of the step S606 is YES, the relative position is between LUTDATA[0] and LUTDATA[4], so that there is set IPDATA=(LUTDATA[0]+LUTDATA[4])>>1 (S613).

If the result of the step S607 is YES, the relative position is equally distanced from four points LUTDATA[0], LUTDATA[1], LUTDATA[4] and LUTDATA[5], so that there is set IPDATA=LUTDATA[0]+LUTDATA[1]+LUTDATA[4]+LUTDATA[5]>>2 (S614).

If the result of the step S608 is YES, the relative position is equally distanced from four points LUTDATA[0], LUTDATA[2], LUTDATA[4] and LUTDATA[6], so that there is set IPDATA=LUTDATA[0]+LUTDATA[2]+LUTDATA[4]+LUTDATA[6]>>2 (S615).

If the results are all NO in the steps S602 to S608, namely in case point=7, the relative position is at the center of eight points LUTDATA[0] LUTDATA[7], so that there is set IPDATA=LUTDATA[0]+LUTDATA[1]+LUTDATA[2]+

LUTDATA[3]+LUTDATA[4]+LUTDATA[5]+LUTDATA[6]+LUTDATA[7]>>3 (S616).

The above-explained interpolation, employed in the present embodiment, does not use any multiplication as will be apparent from the steps S609 to S616. Even the step S616, containing the largest number of operators, can be achieved by 7 additions and bit shifts. As the number of bits to be processed increases significantly in the high-resolution printer, even a very small difference in process time per pixel leads to a large difference for the entire image. The difference of the present embodiment lies in the method of determination of the color conversion correcting information g(i) for the input point i. The present embodiment is featured principally in the approximation of color conversion. The conventional interpolating method utilizing LUT linearly calculates g(i) by multiplications and summations, utilizing all the lower bits, based on the correction information of the lattice points by the upper bits. Also the conventional method employing pre-conversion into the gradation levels corresponding to the lattice points, prior to the input into LUT, utilizes the corrected lattice point such as f(a) or f(b) instead of g(i).

These two methods are different in the method of using the lower bits. In the former method they are used for interpolation after LUT, while, in the latter method they are used for searching the optimum lattice point before input into the LUT.

In comparison with these conventional method, the present embodiment is featured by employing approximation to a relative position that can be calculated by additions and bit shifts, instead of the interpolation requiring multiplications and summations. Consequently the present embodiment can be executed much faster than the former conventional method, and, in comparison with the latter conventional method, can increase the number of quantizing levels approximately by a bit for each color, with a same table capacity and with an almost processing speed, though non-linearity cannot be eliminated within the matching cube.

Figure 5C:
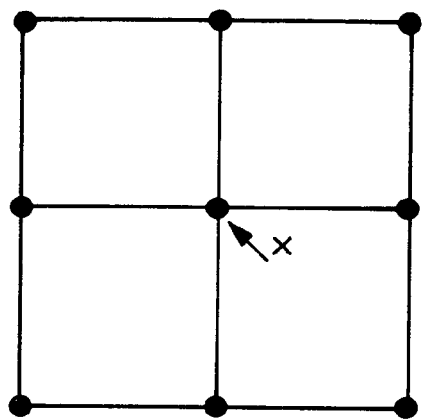
FIGS. 5A to 5C are views showing comparison of the concepts of the embodiment 1 and the conventional configuration.
Figure 5B:
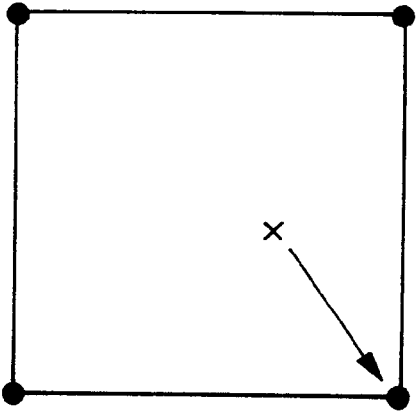
Figure 5A:
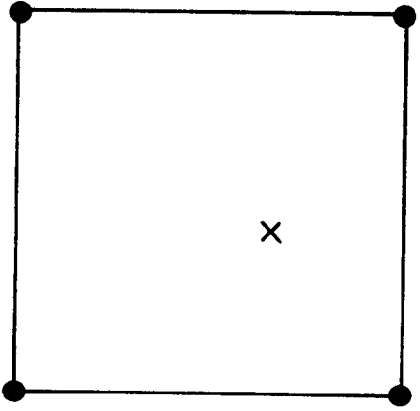

FIGS. 5A to 5C schematically illustrate the difference among the two conventional method and the present invention, in a simple two-dimensional model. FIG. 5A shows the calculation of the correction value of coordinate by interpolation. Consequently the desired coordinate (x) does not move. FIG. 5B shows pre-conversion of gradation, in which the correction value is replaced by the lattice point, so that there results a large movement of the desired coordinate value (quantizing error). FIG. 5C shows the case of the present invention, wherein the quantizing errors is reduced to ½ of that in FIG. 5B, so that the desired correction value can be approximated to the values other than the lattice points.

In the present embodiment, there has been explained a case of extracting the correction information of 8 points of the matching cube in advance from the LUT, regardless of the relative position. However such information of 8 points are used only for one vertex of the interpolating cube (point=7 in the foregoing case), so that it is also possible to extract the necessary correction information only of the matching cube, depending on the relative position.

Embodiment 2

Figure 6:
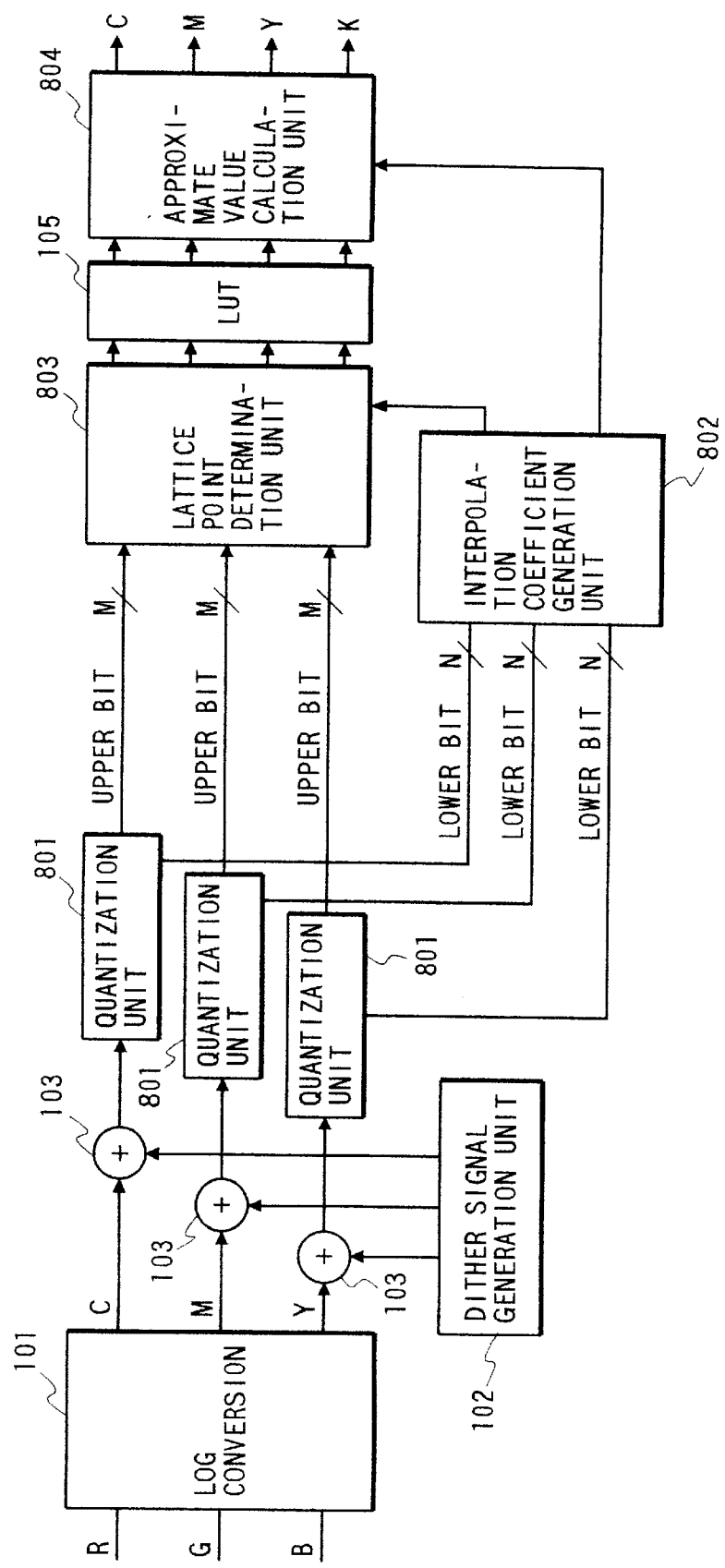
FIG. 6 is a schematic block diagram of an embodiment 2.

FIG. 6 is a schematic block diagram of an embodiment 2, which is only partially different from the embodiment 1 shown in FIG. 1. Therefore common units are represented by common numbers, and the following explanation will be given only on the different points. A quantization unit 801 separates the upper M bits and the lower N bits for each color. For example, if the data are 8 bits for each color, $M+N \leq 8$. The lower N bits for each color are transferred to an interpolation coefficient generation unit 802, for generating the rate of vertices of the matching cube. The generation of the interpolation coefficient, featuring this embodiment, will be explained later. The lattice points required for the interpolation, set according to the interpolation coefficient, are transmitted to the lattice point determination unit 803 for determining the address of the vertices of the matching cube, to be entered into the LUT 105. The LUT 105 stores, as in the embodiment 1 shown in FIG. 1, the conversion values from the device-independent CMY values given by the upper bits to the device-dependent CMYK values. An approximate value calculation unit 804 executes interpolation to calculate the approximate value, based on the conversion correction values of the vertices from the LUT 105 and the interpolation coefficients of the vertices from the interpolation coefficient generation unit 802.

In the following there will be explained the method of interpolation, based on a flow chart shown in FIG. 7.

Figure 7:
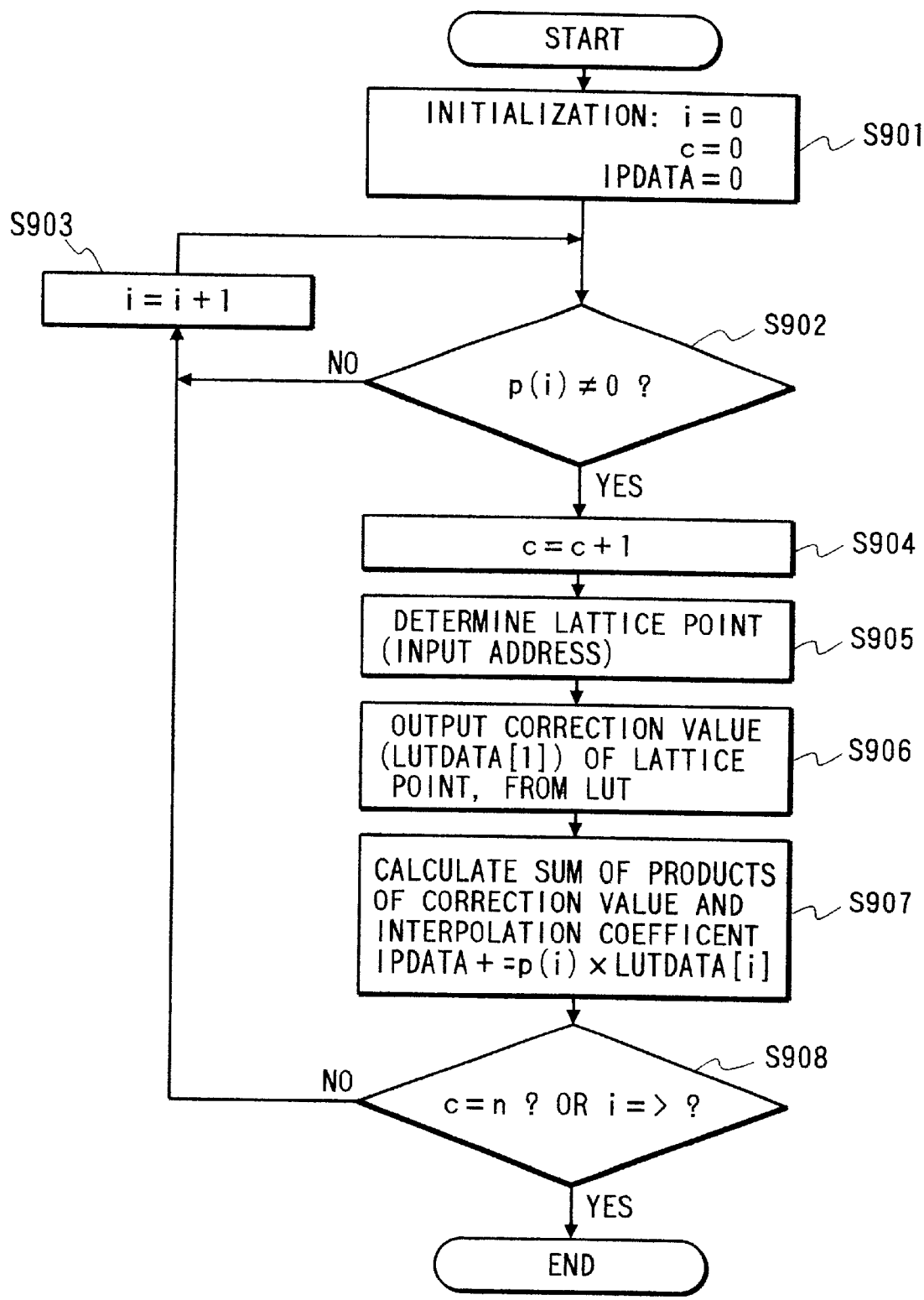
FIG. 7 is a flow chart showing the control sequence for approximate value calculation in the embodiment 2.

In FIG. 7, a step S901 indicates initialization, in which i indicates the vertices (0–7) of the matching cube, c indicates a variable counting the non-zero interpolation coefficients. As in the embodiment 1, IPDATA indicates the device-dependent CMYK correction information.

A step S902 discriminates whether the interpolation coefficient p(i) at a vertex i is non-zero. If p(9)=0, a step S903 reviews i, and the sequence proceeds to a next vertex. If it is non-zero, a step S904 effects an increment of the counter variable c for the non-zero interpolation coefficients.

For a vertex having a non-zero interpolation coefficient, a step S905 determines an input address which is a lattice point. Thus the absolute position of the vertex i of the matching cube is transmitted to the LUT. A step S906 releases the engine-dependent CMYK correction value (LUTDATA[i]), stored in the transmitted address. A step S907 executes multiplication and summation of the interpolation coefficients p(i) and the correction values LUTDATA[i], and the obtained result is added to the IPDATA. A step S908 discriminates whether the non-zero counter variable c has reached a predetermined number n (<8) or whether the vertex has reached the last one 7, and, if either is reached, the sequence is terminated, but, if not, the sequence returns to the step S903 to proceed to the next vertex.

As will be apparent from the flow chart shown in FIG. 7, the process speed becomes faster as the number of vertices where the interpolation coefficient is 0 increases. Thus, the present embodiment controls the process speed by the number n specified for the step S908. Stated differently, the number of calculations is reduced by employing n vertices only for the interpolation, among 8 vertices of the matching cube.

As already explained in the foregoing, the conventional interpolation requires 24 multiplications and 7 additions. In the present embodiment, these are replaced by n operations and (n−1) additions, through an improvement in the generation of the interpolation coefficient. There will naturally result an input point for which the relative position in the cube and the interpolation coefficient do not mutually correspond, but the color conversion error becomes negligible over plural pixels, because of the preceding addition of the dither signal.

Figure 8:
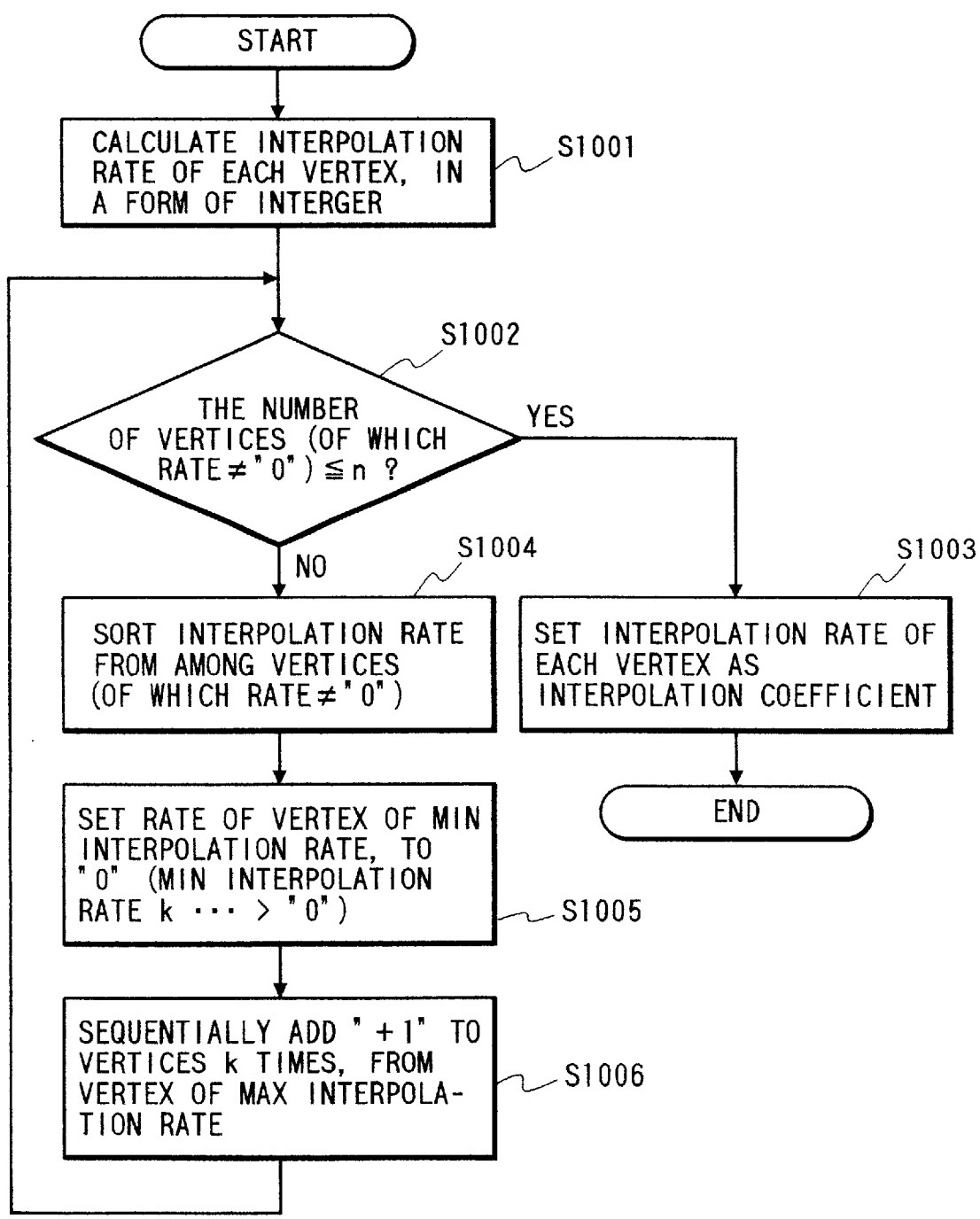
FIG. 8 is a flow chart showing the setting sequence for interpolation coefficient in the embodiment 2.

In the following there will be explained, with reference to FIG. 8, an example of the control sequence, executed in the interpolation coefficient generation unit 802, for limiting, in advance, the number of non-zero interpolation coefficients to n.

At first a step S1001 calculates a proper interpolation rate, matching the relative positions of the vertices, in a ratio of integer. A step S1002 counts the number of vertices having non-zero interpolation rates, and discriminates whether the counted number is within a predetermined number n. If the counted number is within n from the beginning, the exact interpolation rate of each vertex can be set as the interpolation coefficient (S1003). If the number of non-zero vertices exceeds n, a step S1004 sorts the non-zero vertices based on the interpolation rate. A step S1005 replaces the interpolation rate k with 0, wherein k is the minimum interpolation rate among the vertices after such sorting. Such replacement of k with 0 makes k coefficients surplus, which is consumed in a step S1006 by making additions of +1 to each of k vertices in the decreasing order of the interpolation rate, starting from the vertex with the largest interpolation rate. If the surplus k cannot be consumed by the additions of +1 each to all the non-zero vertices, the additions are repeated again, starting from the vertex with the largest interpolation rate. The steps S1004, S1005 and S1006 are repeated until the number of the non-zero vertices becomes equal to or smaller than n. (The sorting operation need not be repeated each time if the sorting order is memorized).

Figures 9, 10:
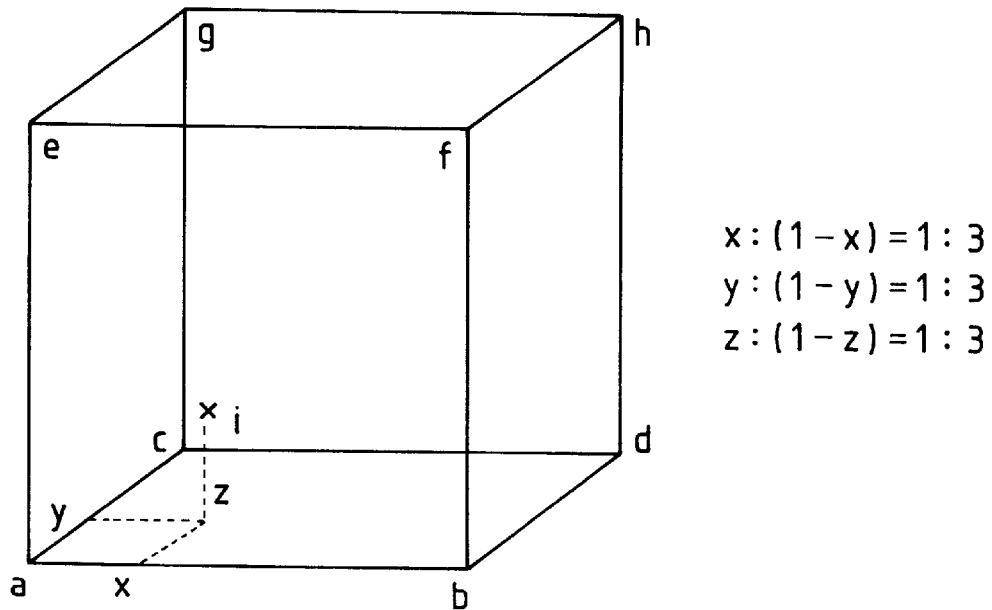
FIG. 9 is a view of a matching cube showing an example of setting of the interpolation coefficient.
FIG. 10 is a table showing an example generation of the interpolation coefficient.

Now, there will be explained an example of setting of the actual interpolation rate and the interpolation coefficient, with reference to FIGS. 9 and 10. FIG. 9 illustrates a matching cube, of which vertices are represented by a–h for the purpose of simplicity. It is assumed that there are obtained 6 upper bits and 2 masked lower bits by quantization, and that the interpolation coefficient calculation unit receives 6-bit information, including 2 bits for each of 3 colors. It is now assumed that the input information has a relative position i within the matching cube, as shown in FIG. 9. It is further assumed that the relative position i is at a distance ¼ from the vertex a, in all the three axes, when the sides of the cube is normalized to 1 and the vertices of the relative cube formed by the lower bits are represented by a–h. Since each axis is represented by 2 bits, there can be entered a value 00, 01, 10 or 11, and, the point a has a coordinate (00, 00, 00) while the point i has a coordinate (01, 01, 01). In interpolating the coordinate of the point i from the vertices with three-dimensional linear interpolation which is executed in volumic ratio, the interpolating calculation is conducted with the ratios described in the column "interpolation rate" in FIG. 10 (by multiplying the rates, adding the products and dividing by 64 (6 bit shifts)). With such interpolation rates, the number of calculations increases as all the 8 vertices have coefficients (8 multiplications and 7 additions even if the interpolation rates are calculated in advance). In order to reduce the number of calculations, the values shown in the column "interpolation coefficient" are obtained by reducing the number of non-zero coefficients by setting n=4 in the flow chart shown in FIG. 8. Because n=4, the interpolation (approximated) can be realized with 4 multiplications and 3 additions.

Even in the flow chart shown in FIG. 7, the multiplications and summations have to be followed by a division by bit shifts, if the interpolation coefficients are not normalized to 1 but are represented in integral ratios of which sum is equal to an exponent of 2.

As the process time and the precision of interpolation vary with the set value of n, it may be rendered settable by the user according to the purpose.

The interpolation coefficient generation unit may have the above-explained interpolation coefficients, reduced to n points, in the form of a LUT, or may assume another form.

In the configurations shown in FIGS. 1 and 6, the logarithmic conversion is executed prior to the input to the LUT, but it is naturally possible to include such logarithmic conversion in the LUT.

Satisfactory color process can be achieved at a high speed, by applying the color process of the foregoing embodiments to the color process unit 12 of the host computer 10.

Particularly in case of a system shown in FIG. 11, the recording units of the color printer 20 can achieve faithful reproduction only in the H level.

Consequently, the application of the above-explained approximation in the color process enables high-speed processing, without any substantially influence on the image quality.

Embodiment 3

The embodiment 2 selects, by the lattice point determination unit 803 H, vertices belonging to an interpolating solid, based on the upper M bits of the input image data and the interpolation coefficients based on the lower bits of the input image data. Stated differently, the embodiment 2 is to divide the interior of a cube into unique interpolating solids, and to generate interpolation coefficients based on the relative position of the input image data with respect to the vertices of an interpolating solid to which the input image data belong, thereby executing interpolation.

In such n-point interpolation in which the interior of the cube is divided into unique interpolating solids, the precision of interpolation increases but the process speed becomes lower with an increase of n. A smaller value of n provides a faster process speed, but the result becomes more susceptible to the influence of local non-linearity.

Also because the interior of the cube is divided into unique interpolating solids, there may result a pseudo contour such as a tone jump, for example in a gradation area of an image, when the input data shifts from an interpolating solid to another, whereby the lattice points employed in the interpolation are switched.

The present embodiment is to enable highly precise interpolation at a high speed.

The present embodiment is featured by generation of the interpolation coefficients with a larger freedom, instead of fixed manner of division into solids. The only requirements is to reduce the number of the lattice points, employed in the interpolation, to n or lower, and such n members may be taken in any combination. For example, in case of using 4 lattice points or less for interpolation, and if the input information has a relative position within a tetrahedron formed by the lattice points a, b, c and e in FIG. 9, there may be used a combination of the lattice points a and h or a and d only, instead of the combination of the lattice points a, b, c and e, depending on the above-mentioned relative position. The interpolation coefficients in such combinations may be experimentally calculated in advance and stored in an LUT.

In the following there will be explained a configuration of the present embodiment 3, for limiting the number of the lattice points, to be used in the interpolation, to 4 or less, with reference to FIG. 14. In this drawing, components same as those in other embodiments are represented by same numbers and will not be explained further. The interpolation coefficient generation unit 302 of the present embodiment is adapted, in case the input image data is positioned on a diagonal line on a plane or in a solid, to generate interpolation coefficients for effecting interpolation based on the relative position of such image data with respect to the two end points of such diagonal line. Also in case the input image data is positioned not on a diagonal line but on a face of a tetrahedron, it generates interpolation coefficients for effecting interpolation based on the relative position of the image data with respect to the three vertices constituting such face. In case the input image data is not positioned on a diagonal line nor on a face but within a tetrahedron, it generates interpolation coefficients for effecting interpolation based on the relative position of the image data with respect to the four vertices constituting such tetrahedron.

Based on such interpolation coefficients, the lattice point selection unit 303 selects the lattice points, and the approximate value calculation unit 304 effects interpolation, thereby calculating approximate values C, M, Y, K corresponding to the image data.

Now there will be explained an example with a tetrahedron abce shown in FIG. 9. For example, if the input image data is positioned on a diagonal a-d, a-f, a-g or a-h, even if it is positioned inside the tetrahedron abce, the interpolation coefficient generation unit 302 generates the interpolation coefficients corresponding to the respect two vertices, i.e. (a,d), (a,f), (a,g) or (a,h).

It is thus made possible to adopt different combinations of the vertices employed in the interpolation, even though the input image data belongs to a same interpolating solid and a same color space. Stated differently, the interpolating solid is not uniquely defined but is varied according to the position of the input image data, under a condition of limiting the number of lattice points employed for interpolation to 4 or less.

Consequently, for example in a gradation area, though only 4 vertices are used for a single pixel, all the 8 vertices are utilized if plural pixels are considered. It is therefore possible, though the value of n is limited to 4, to maintain the continuity between the interpolating solids and to satisfactorily reproduce the gradation without the influence of local non-linearity.

The present embodiment can therefore provide an image which is comparable to that obtained with interpolation employing a larger number of interpolating members, when plural interpolated pixels are considered, though each pixel is interpolated only with n interpolating members.

Besides the present embodiment can provide a process speed comparable to that in the n-point interpolation.

Embodiment 4

The present embodiment is featured not only by unfixed solid division but also by the use of many interpolation terms in the interpolation. However, since such many interpolation terms will required a long process time if applied to a single input pixel (as in the conventional 8-point interpolation), they are applied to plural input pixels. For the same purpose, the embodiment 2 executes addition of the dither signal prior to the input to the LUT.

The dither signal addition n the embodiment 2 is to reduce the interpolation error, resulting from the 4-point interpolation instead of the 8-point interpolation, and the concept of the embodiment 1 is also same.

In contrast, the present embodiment 4 executes the addition of the dither signal, for the purpose of "changing the n members employed in the interpolation", thereby obtaining, over plural pixels, an image of the quality comparable to that obtainable by interpolation with larger number of points.

In the embodiment 4, the dither signal addition is applied to the n-point interpolation by division into unique interpolating solids, thereby enabling interpolation of a higher precision than in the n-point interpolation.

Now the present embodiment will be explained with reference to FIGS. 13, 14 and 15.

Figure 13:
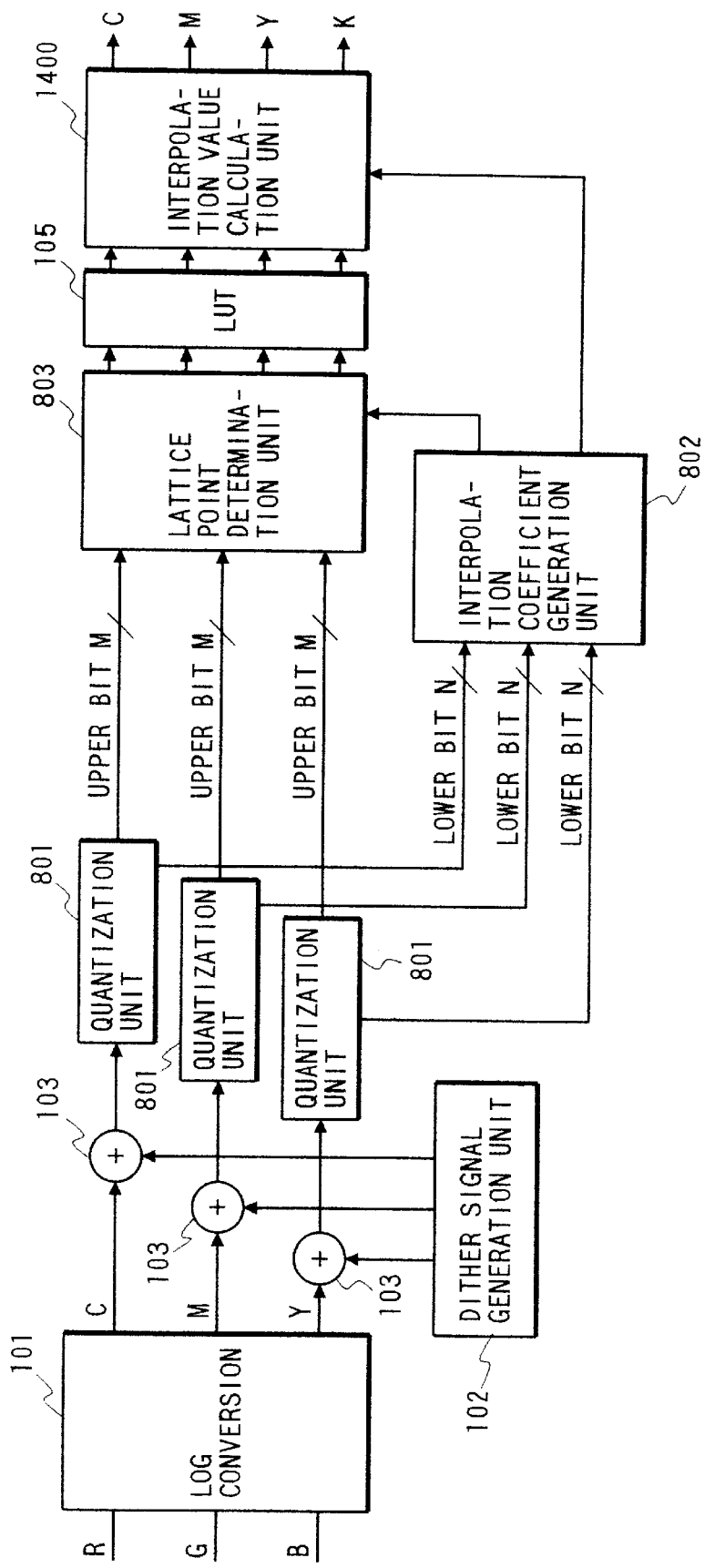
FIG. 13 is a schematic block diagram of an embodiment 4.

The configuration shown in FIG. 13 is only partly different from that shown in FIG. 6. In the conventional fixed solid division, the n-point interpolation can be executed in exact manner, instead of approximate manner. Consequently the interpolation value calculation unit 1400 effects interpolation with interpolating terms of n points. Other signal flows are same as in FIG. 6.

Figure 14:
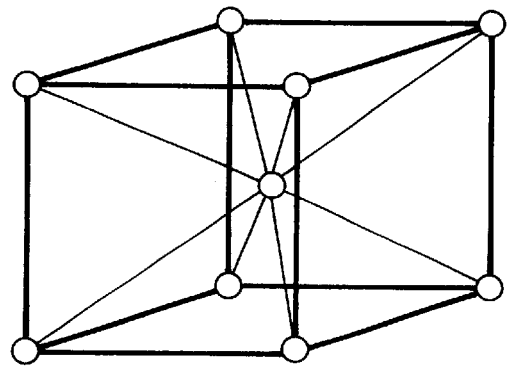
FIG. 14 is a view showing a matching cube in the embodiment 4.
Figure 15:
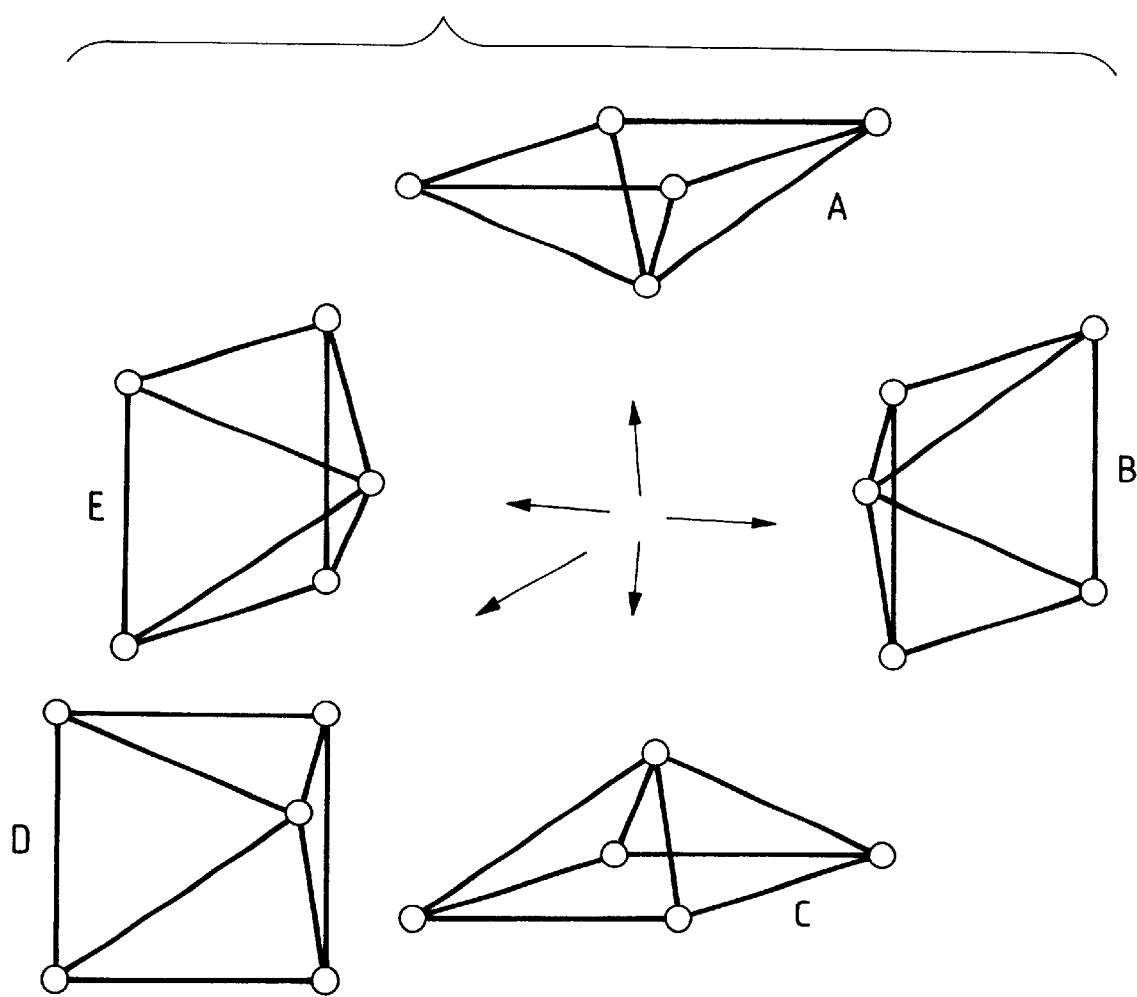
FIG. 15 is a view showing an interpolating cube in the embodiment 4.

FIG. 14 illustrates a matching cube. In the following there will be explained a case of 5-point interpolation, assuming that the correction value for the center of gravity of the cube is also stored. The marks ○ indicate the lattice points where the correction values are stored. FIG. 15 shows the division of the matching cube in FIG. 14 into 5 pentahedral interpolating solids A–E, each constituted by the center of gravity and four surfacial vertices. In the conventional interpolation, there are determined the relative position within the matching cube and one of the pentahedral interpolating solids A–E in which the input image data belongs, according to the lower bits of the input color components.

In the embodiment 4, the interpolating solid corresponding to the input image data can be controlled by the dither signal, though the solids are divided in unique manner. Stated differently, the selection of the members employed for interpolation can be controlled by the addition of the dither signal.

Consequently there can be obtained an image which is comparable, among plural pixels, to that obtained by interpolation employing a larger number of members, though each pixel employs only n members for interpolation as in the embodiment 3.

Still the process speed is comparable to that of the n-point interpolation.

In the above-explained embodiment, the members may not remain within a single interpolating solid, because of the influence of the addition of the dither signal. Such situation corresponds to an interpolation with plural interpolating solids, meaning the use of a larger number of interpolating terms among plural pixels. The amplitude of such dither signal is preferably determined in experimental manner, but an excessively large amplitude naturally leads to degradation of the image quality.

Embodiment 5

Figure 16:
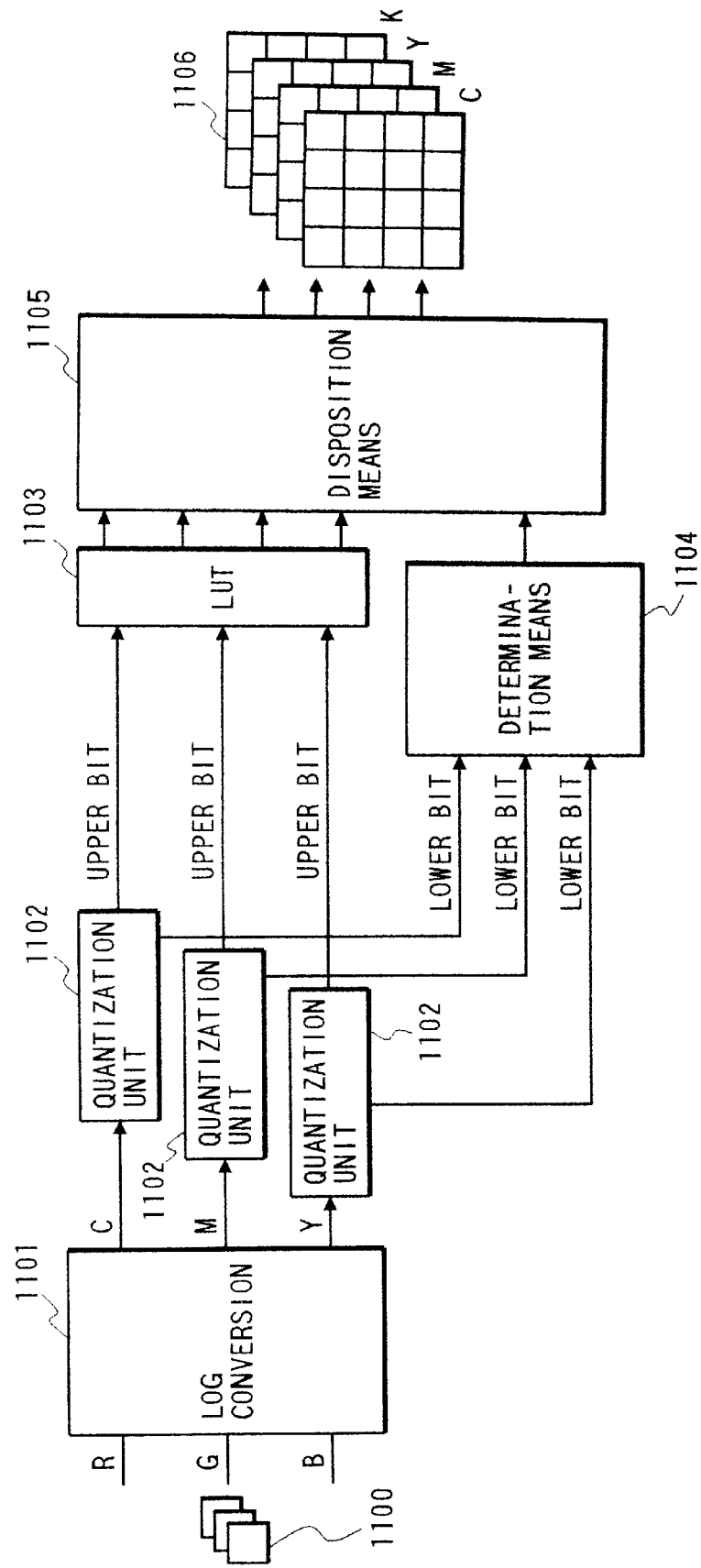
FIG. 16 is a block diagram showing an example of the configuration of the image processing apparatus of an embodiment 5.

FIG. 16 is a block diagram of an embodiment of the present invention, employing, for example, a printer engine capable of YMCK 32-bit output with 1200 dpi, with input of RGB 24-bit information with 300 dpi from a host computer.

Thus the present embodiment effects color conversion from the input image information of RGB 24 bits into the image information of YMCK 32 bits, dependent on the printer, and also effects resolution conversion from 300 dpi into 1200 dpi.

An RGB target pixel 1100 is a multi-level information of 8 bits for each color. Logarithmic conversion means 1101 effects logarithmic conversion on the RGB information to prepare complementary color CMY information. The gamma correction may also be applied on the input information. Each of the prepared CMY signals is supplied to quantizing means 1102 for separation into upper bits and lower bits. This operation may also be achieved by a simple bit mask. The upper bits of each color are supplied to the LUT 1103, which stores the CMYK correction values, matching the color reproduction characteristics of the output device, for each quantization point (lattice point). In the present embodiment, for the purpose of simplicity, the correction value for a lattice point n is represented by f(n), and the conversion information for a desired input point m is represented by g(m). Based on the entered upper bits, the LUT 1103 identifies a cubic lattice in which the input information belongs, and releases the correction vales of 8 points surrounding the input value (8 vertices a–h in case of FIG. 17). On the other hand, the lower bits masked in the quantization means 1102 are transmitted to generated pixel number determination means 1104. There may be transmitted all the lower bits, or the bits less than the lower bits masked in the quantization means 1102 if it is desired to reduce the capacity of the table. Also the numbers of the upper and lower bits may be experimentally determined, in consideration of the system configuration and the desired image quality.

The generated pixel number determination means 1104 determines the number of output pixels for each vertex, according to the image enlargement rate.

Figures 17, 18:
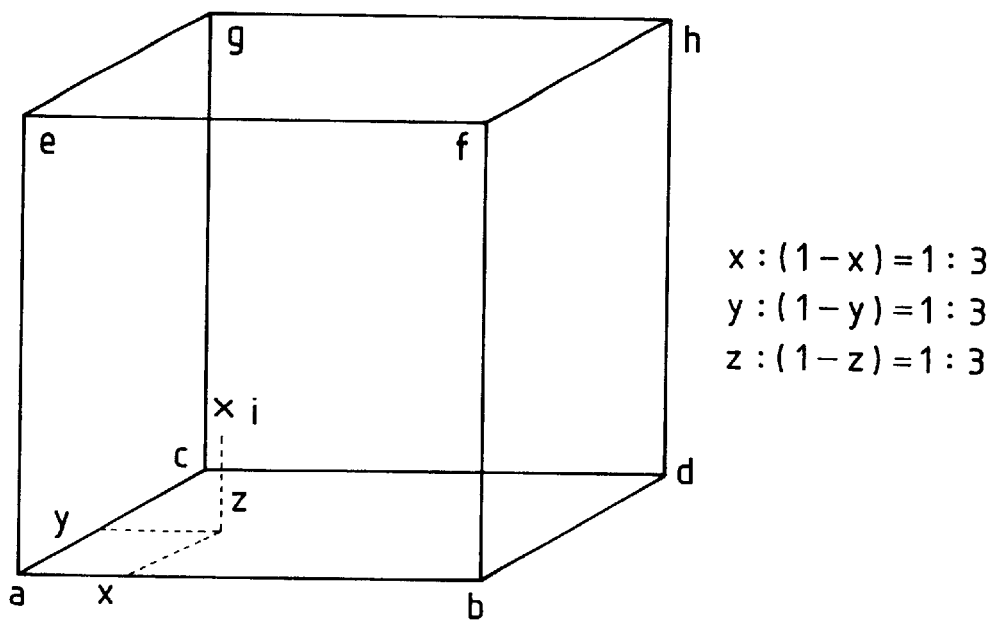
FIG. 17 is a view showing an example of the input point.
FIG. 18 is a view showing an example of the storage table of generated pixel number determination means.

Now reference is made to FIG. 18 for explaining the method of determining the number of generated pixels. In the present embodiment the quantized data is assumed to contain 6 upper bits and 2 lower bits for each color component. Thus the generated pixel number determination means 1104 receives 6-bit information, containing 2 bits for each of 3 colors.

It is also assumed that the input information has a position i within the cubic lattice shown in FIG. 17, having a distance of ¼ from the vertex a on each of three axes, when the side of the cube is normalized to 1 and the vertices of the cube formed by the lower bits are represented by a–h. Since each axis is represented by 2 bits, there can be entered a value 00, 01, 10 or 11, and, the point a has a coordinate (00, 00, 00) while the point i has a coordinate (01, 01, 01).

In interpolating the coordinate of the point i from the vertices with three-dimensional linear interpolation, which is executed in volumic ratio, the interpolating calculation is conducted with the ratios described in the column "rate" in FIG. 28 (by multiplying the rates, adding the products and dividing by 64).

Thus the "rate" indicates the level of approximation of the input information to the vertices.

The generated pixel number determination means 1104 stores, in advance, a number of pixels matching such rate, according to the number of pixels to be expanded. In the present embodiment, the number of pixels has to be increased to 4 times both in the vertical and horizontal directions, in order to obtain an output of 1200 dpi from the input of 300 dpi. Thus YMCK 16 pixels are to be prepared from the target RGB pixel shown in FIG. 16. The column "rate of number of pixels" in FIG. 18 shows the proportion of the 16 pixels prepared by the vertices according to the "rate" (rate×16/64).

Since a fractional number of pixels cannot be formed, the "pixel rate" is rounded to give the "number of generated pixels".

The input information of the coordinate i can be approximated by generating the pixels by the above-mentioned number from each vertex. Thus the color of the input information can be approximated by the area rate of the color components in the 16 pixels.

In this embodiment, the number of pixels generated from each vertex may be increased up to 4 bits, but 4-bit output may be made from each vertex or combinations of the numbers of pixels generated from the vertices may be given in plural codes.

Disposition means 1105 receives the color correction output, composed of the CMYK color components of the 8 vertices from the LUT 1103, and the numbers of generated pixels of the vertices, from the generated pixel number determination means 1104, and arranges the correction values in 4×4 pixels for each of the CMYK components (result being indicated by 1106).

Figures 19, 20A, 20B, 20C:
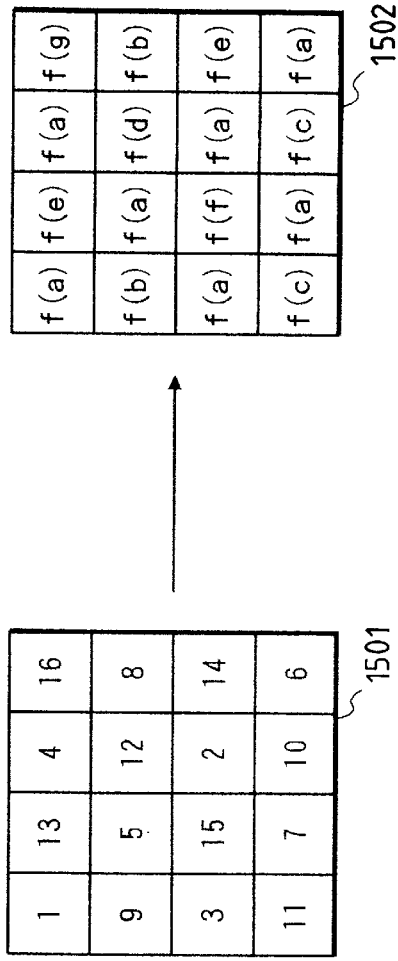
FIG. 19 is a view showing an example of positioning in disposition means.
FIGS. 20A to 20C are views showing comparison of the concepts of this invention and the conventional configuration.

The method of such arrangement will be explained with reference to FIG. 19. In the example shown in FIG. 18, the generated pixel number determination means 1104 causes the vertex a to generate 7 pixels, b to generate 2 pixels, c to generate 2 pixels, d to generate 1 pixel, e to generate 2 pixels, f to generate 1 pixel, g to generate 1 pixel and h to generate 0 pixel. The disposition means 1105 arranges these pixels in such a manner that the pixels corresponding to a same vertex are not mutually adjacent. For example, 1501 in FIG. 19 shows such dispersed arrangement. By arranging the pixels, starting from f(a), in the order shown in 1501, there is obtained an averaged arrangement because the correction values of a same vertex are dispersed. 1502 shows the 16 pixels after the arrangement. It is thus possible to disperse satisfactory 16 pixels obtained by high-speed conversion.

The difference between the present invention and the conventional configuration lies in the method of determination of the desired output information g(i), and the present invention is principally featured by the use of approximation in the color conversion.

The conventional LUT method employing interpolation linearly calculates g(i) utilizing the lower bits, based on the interpolation information of the lattice points corresponding to the upper bits, and another conventional method employing pre-conversion into the number of gradation levels corresponding to the lattice points, prior to the input to LUT, utilizes the correction results corresponding to the lattice points, such as f(a) or f(b) instead of g(i).

These two method are different in the method of use of the lower bits, which are used in the former in the interpolation after the use of LUT, and, in the latter, in the search of the optimum lattice point after the use of LUT.

In contrast to these conventional methods, the present invention is featured by a fact that the lower bits are used for determining the number of pixels generated from the vertices, instead of effecting interpolation. In the present embodiment, g(i) is not to be calculated nor to be replaced by f(a) or f(b). More specifically, g(i) is approximated by a group of f(a)–f(h), which are the correction values of the vertices. FIGS. 20A to 20C schematically show the different among the two conventional methods and the present invention, in a simple two-dimensional model, wherein a black circle indicates a vertex of lattice, and a mark x indicates the input point. FIG. 20A shows the calculation of correction value of the coordinate by interpolation, wherein the desired coordinate does not move. FIG. 20B shows the case of pre-conversion of gradation levels, wherein the input value is replaced by a lattice point, so that the target coordinate shows a significant movement. FIG. 20C shows the case of the present invention, in which the desired correction value is approximated by the approximation of the coordinate. Because of such approximation, there results a certain movement from the original coordinate position i, so that the value g(i) is somewhat displaced n comparison with the case of interpolation. On the other hand, there can be achieved a significantly higher process speed.

FIG. 19 shows a dispersed arrangement, but the arrangement is not limited to such case, and may be modified according to the number of pixels generated from each vertex. It is therefore possible also to set the arrangement according to the number of pixels generated from each vertex.

The present embodiment enables satisfactory color correction and resolution conversion (enlargement process) in an extremely fast manner.

Figure 21:
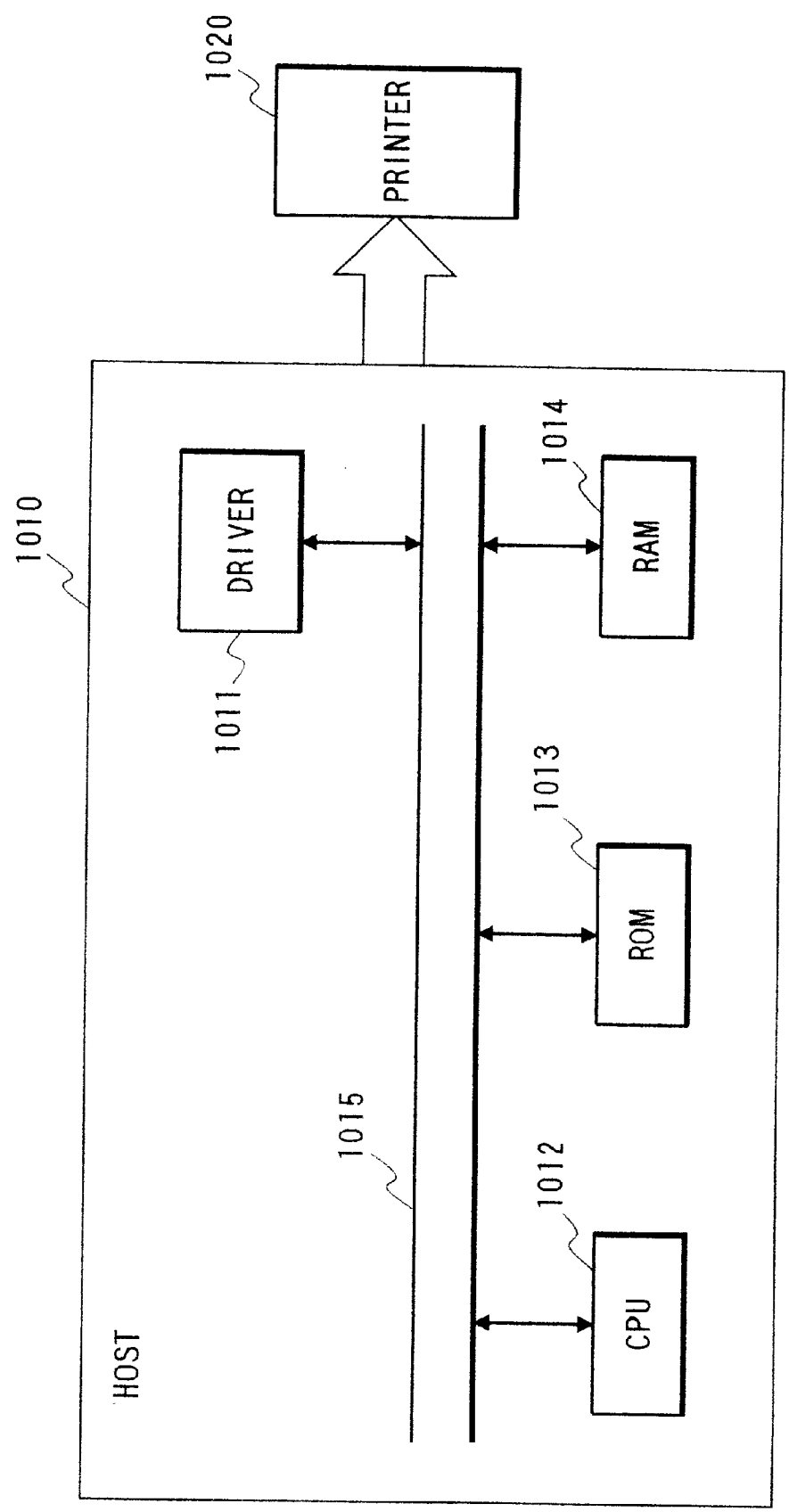
FIG. 21 is a schematic view showing an example of the system of an embodiment.

FIG. 21 is a block diagram of a system in which applied is the method explained in the foregoing embodiments.

A host equipment 1010 is provided with a driver 1011 for executing various processes such as color process, a CPU 1012, a ROM 1013 and a RAM 1014.

The CPU 1012 controls the driver 1011 through a CPU bus 1015, based on a program stored in the ROM 1013 and using the RAM 1014 as a work memory.

Thus the host equipment 1010 sends, to a printer 1020, CMKY binary image information of 1200 dpi, subjected to pseudo gradation process.

The printer 1020 form an image on a recording medium, based on the entered CMKY binary image information of 1200 dpi and utilizing a recording head which discharges liquid droplets by film boiling based on thermal energy.

In the following there will be explained the configuration of the driver 1011, with reference to FIG. 22.

The present embodiment contains pseudo gradation process means in addition to the configuration shown in FIG. 16. In FIG. 22, components same as those in FIG. 16 are represented by same numbers and will not be explained further. In the present embodiment, there will be explained, as an example, a configuration of converting the RGB 24-bit input image information of 300 dpi into YMCK 4-bit information of 1200 dpi. The generated pixel number determination means 1104 releases the number of pixels to be generated from each vertex, according to the lower bits of each color. In order to convert the target pixel into 16 pixels, the sum of the number of pixels to be generated from the vertices is naturally equal to 16. The LUT 1103 generates the correction values CMYK of the vertices of a cubic lattice containing the input point, based on the quantized upper bits. Pseudo gradation process means 1701 converts the data of each color into a binary signal, by the dither method. An address counter 1702 principally receives the position information of the target pixel. The pseudo gradation process means 1701 compares each correction value with the dither signal, according to the number of pixels generated from each vertex. The dither signal in advance has, in an internal dither matrix, 16 fixed threshold values, which can be finely adjusted to the address counter 1702. Though the dither method employing 16 fixed threshold values is inferior in the gradation of binary image (being only capable of reproducing 16 levels), an improved gradation can be achieved by vibrating the threshold value even for the target pixel of the lower resolution. More specifically, by vibrating the threshold values for the 16 pixels of low resolution, there can be reproduced, in total, 16×16=256 levels. The binary signal obtained from the means 1701, representing on or off in each of 16 pixels in each of CMYK colors, are arbitrarily arranged by the disposition means 1703. Such arrangement may be conducted in an arbitrary manner. The CMYK dots may be mutually superposed, or may be arranged without superposition.

Figure 22:
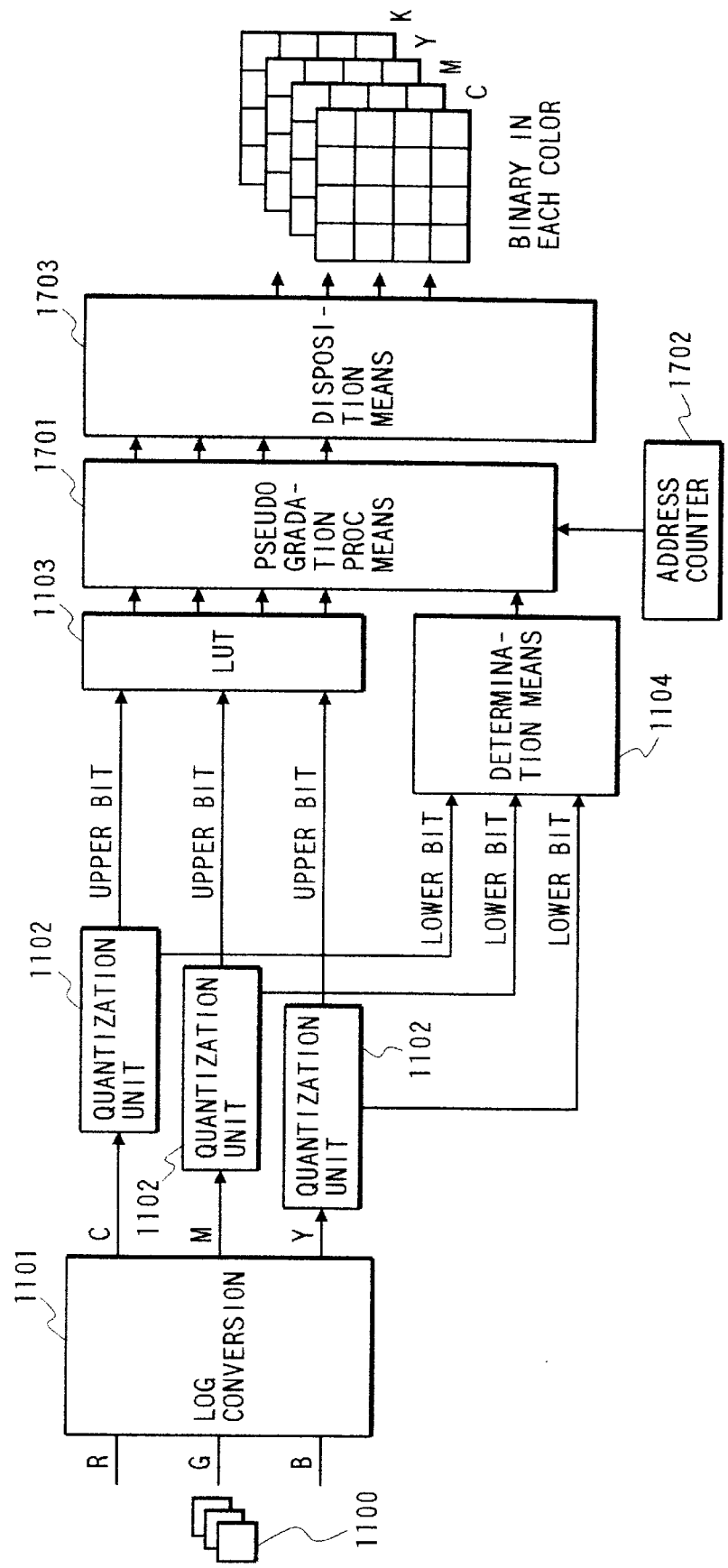
FIGS. 22 to 24 are block diagrams showing examples of configuration of the driver in embodiments of the present invention.
Figure 23:
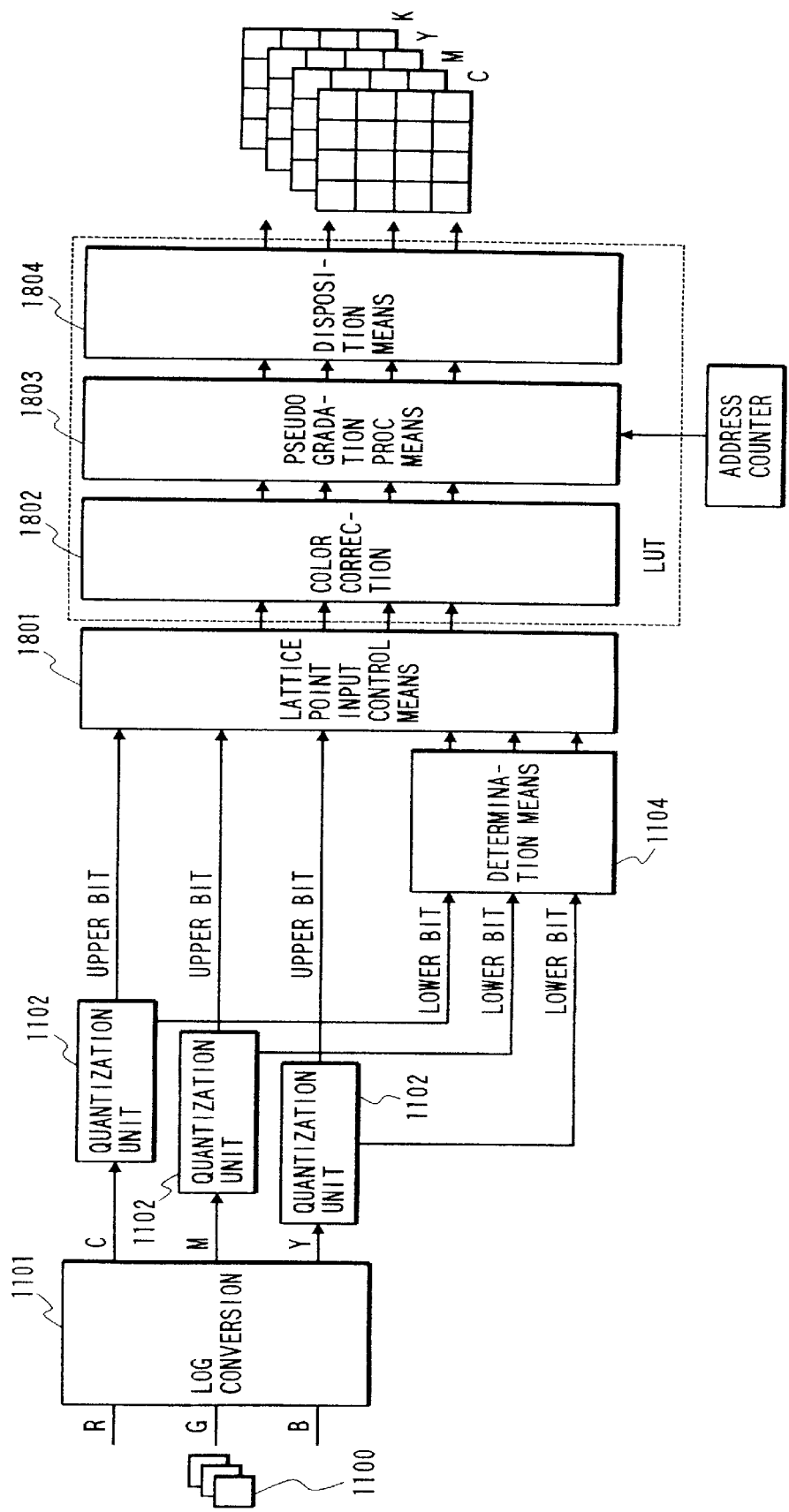

The present embodiment may also be realized in a configuration shown in FIG. 23, wherein components same as those in FIG. 22 are represented by same numbers and will not be explained further. In FIG. 23, lattice point input control means 1801 controls the position and number of input into the color correction table, according to the number of the generated pixels of the vertices from the generated pixel number determination means 1104. More specifically, as the lattice points surrounding the input point can be identified from the upper bits of each color, the quantization points of the vertices of the cubic lattice are entered, corresponding to the number of generated pixels, into the table. This control means effects 16 inputs per target pixel. Then the entered lattice is color corrected in 1802, then pseudo gradation process is executed in 1803 by the dither method, and arrangement in 16 pixels is executed in 1804. In the configuration shown in FIG. 19, in order to achieve a higher process speed, the blocks 1802, 1803 and 1804 are constructed as a LUT (as indicated by a broken-lined frame), whereby the binary CMYK information can be instantaneously obtained from the quantization points of the vertices of the cubic lattice. Thus, this embodiment shows a configuration of achieving color conversion, resolution conversion (enlargement) and binarization at a high speed, by employing the dither method in the pseudo gradation process.

In addition to the configuration shown in FIGS. 22 and 23, there may be conceived various other configurations. Also instead of the binarization by the dither method explained in the foregoing, there may be employed other pseudo gradation processes such as error dispersion method or minimum average error method.

Also the lattice point input control means 1801 may be employed even if the pseudo gradation process is not conducted.

Also, since the present embodiment can control the number of generated pixels, it is possible to identify an uncolored signal if three color components have a same value and to send such signal to the generated pixel number determination means, thereby limiting the vertices to be employed.

Also the present embodiment can achieve satisfactory color correction, enlargement and pseudo gradation process in an extremely fast manner.

Variation of Embodiment 5

Figure 24:
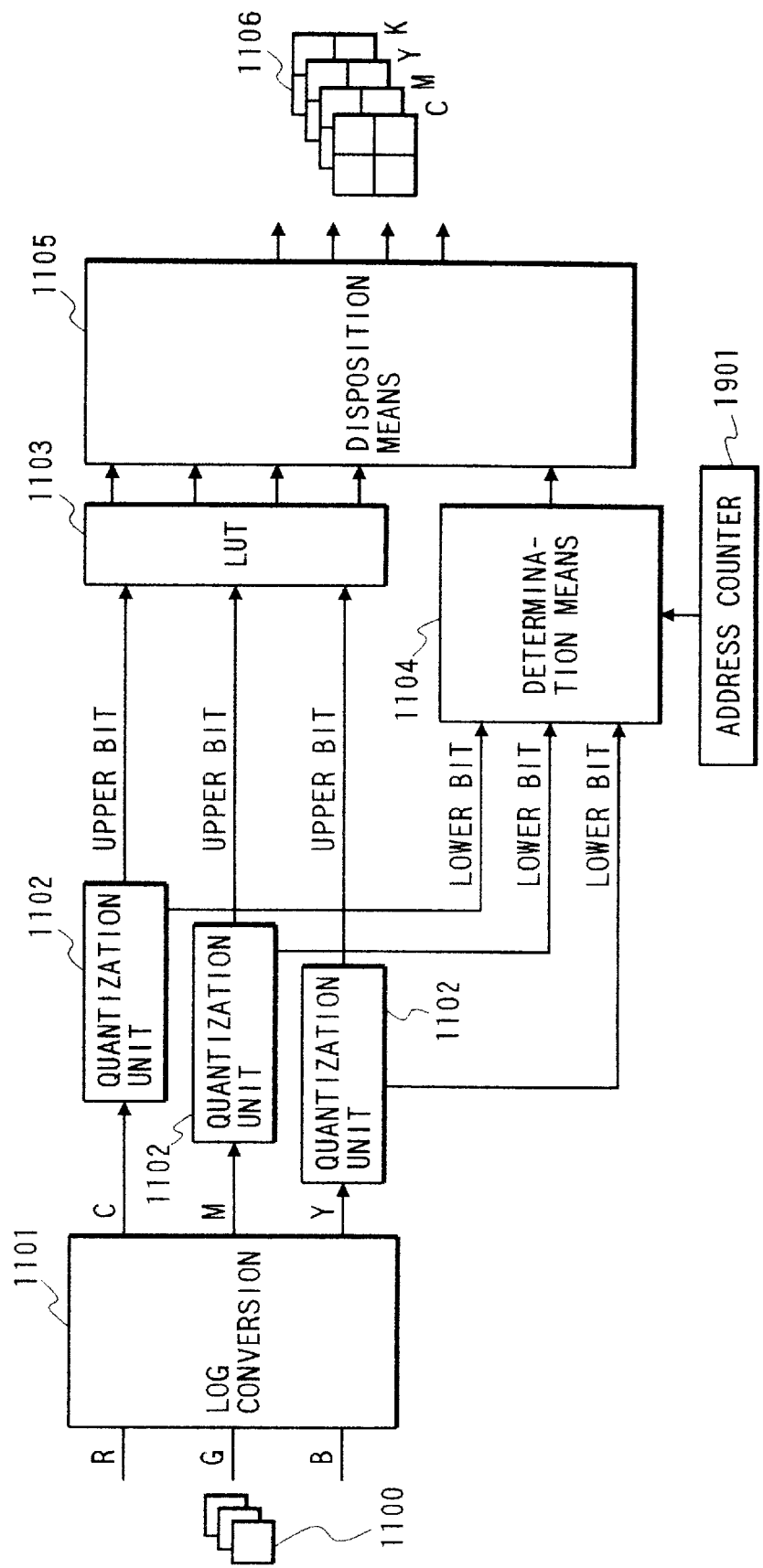
Figure 25:
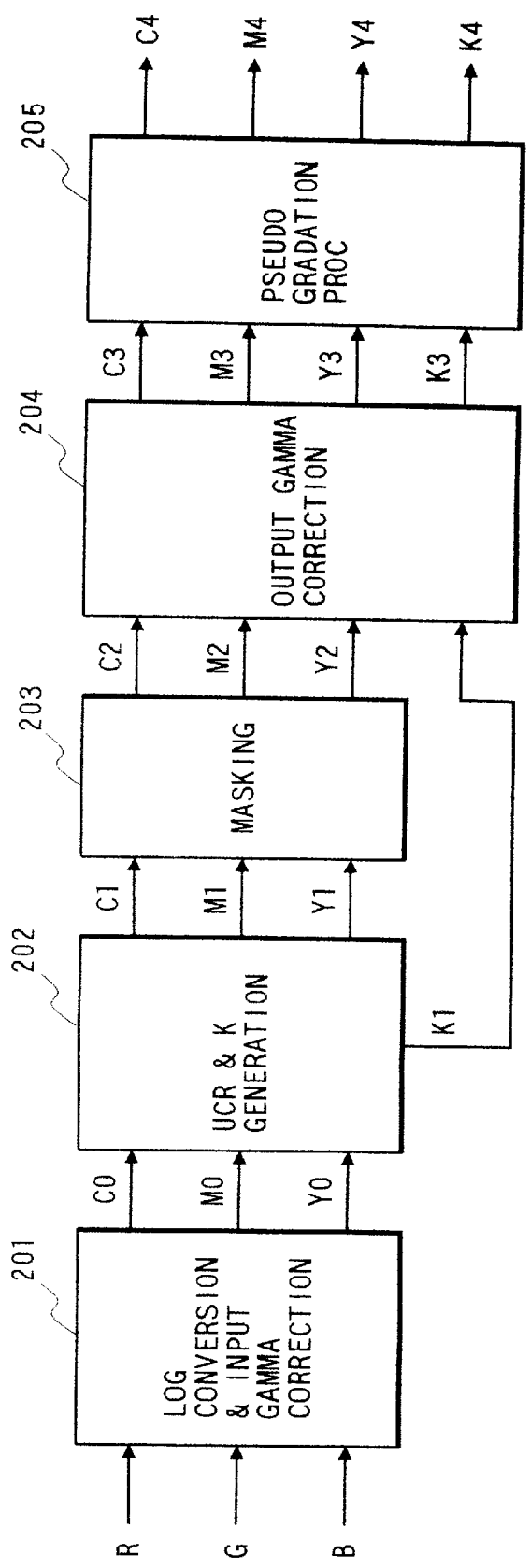
FIG. 25 is a schematic block diagram of a conventional configuration.
Figure 26:
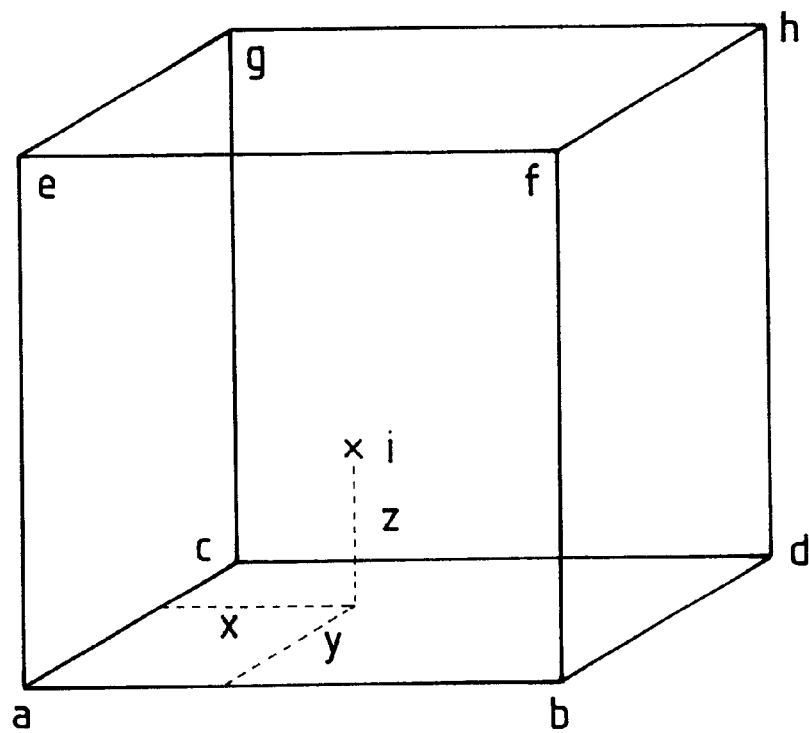
FIG. 26 is a view showing interpolation in the conventional configuration.

FIG. 24 is a schematic block diagram showing a variation, which is only partly different from the configuration shown in FIG. 16. Therefore components same as those in FIG. 16 are represented by same numbers and will not be explained further. An address counter 1901 calculates the position information of the target pixel, for transmission to the generated pixel number determination means 1104. The present embodiment is featured by a fact that also the number of generated pixels of each vertex varies according to the position information. As already explained in the foregoing, in contrast to the conventional methods, the present invention is featured by a fact that the relative position defined by the lower bits within the cube is approximated by the number of pixels required for image enlargement. However such approximating condition also varies significantly by the rate of enlargement and the number of lower bits. For example, in a configuration with an input resolution of 300 dpi and an output resolution 1200 dpi, there are required 4 pixels for each target pixel. The approximation of each vertex within such 4 pixels results in a signification rounding error, whereby the approximation point shown in FIG. 20C becomes distantly displaced. Consequently, the approximating conditions is varied according to the position information of the target pixel.

There can be adopted various methods for such variation, such as vibrating the relative position of the lower bits within the cube by replacing the position information with dither signal.

Also instead of the configuration shown in FIG. 24, there may be conceived a configuration of discriminating a flat area or an edge area and increasing the number of generated pixels in the flat area by forming plural pixels into a block.

The present variation enables satisfactory image process without deterioration of the image quality, even when the enlargement rate is low.

The present invention is also realizable as a printer driver software or as a hardware in the printer.

Also the present invention is naturally applicable to a case where the present invention is realized by supplying a system or an apparatus with a memory medium, recording a software program realizing the present invention, and by reading and executing such program by such system or apparatus. Such memory medium, for storing the program, can be example by a floppy disk, a hard disk, an optical disk, a magnetooptical disk, a CD-ROM, a CD-R, a magnetic tape, a non-volatile memory card or a ROM.

The present invention has been explained by the preferred embodiments thereof, but the present invention is by no means limited to such embodiments and is subject to various modifications within the scope and spirit of the appended claims.

What is claimed is:

1. An image processing apparatus which calculates output color image data from input color image data by using a table, comprising:

a quantization unit for quantizing respective color components constituting the input color image data and outputting upper N bits and one upper (N+1)th bit for each of the respective color components;

a reading unit for reading, from a table in which lattice point data corresponding to plural representative input values have been stored, the plural lattice point data corresponding to the upper N bits; and a processor that performs, according to the plural one bits output by said quantization unit, only an addition process and a bit shift operation from the plural lattice point data to calculate the output image data.

2. An image processing apparatus according to claim 1, wherein said output image data are device-dependent image data.

3. An image processing apparatus according to claim 1, further executing a gradation process for reducing the number of gradation levels of said output color image data.

4. An image processing apparatus according to claim 1, further comprising an adder, arranged to add a dither signal to said input color image data.

5. An image processing apparatus for entering input pixels of image information composed of plural color components with n gradation levels in each color component and effecting a conversion into output pixels of image information of which a number of pixels is increased to (A×B) times that of the plural color components, matching color reproduction characteristics of an image output device, comprising:

a quantizer, arranged to quantize each of the color components of the input information to eliminate lower bits of each color component using a plurality of quantization points;

a conversion table for converting each quantization point into a respective correction value matching the color reproduction characteristics of the image output device, wherein each correction value may have one of n gradation levels;

a pixel determiner, arranged to determine, for each of the input pixels, a number of generated output pixels corresponding to each of the quantization points to be generated as ones of the (A×B) pixels, based on information of the lower bits of each color component eliminated by said quantizer, so that each of the (A×B) pixels has a value equal to the correction value for the corresponding quantization point;

a gradation processor, arranged to reduce a number of gradation levels of the output pixels corresponding to the correction values, released from said conversion table, to m levels (m<n) by a pseudo-gradation process, based on the numbers of generated pixels determined by said pixel determiner; and positioner, arranged to position the generated output pixels of m gradation levels after processing, as the (A×B) pixels of the output image information.

6. An image processing apparatus according to claim 5, further comprising a counter indicating the address of a target pixel, wherein the proportion of the number of pixels generated, at each input point, from the target pixel is varied according to position information indicated by said counter.

7. An image processing method for use with an image processing apparatus that calculates output color image data from input color image data by using a table, said method comprising:

a quantization step, of quantizing respective color components constituting the input color image data and outputting upper N bits and upper (N+1)th bit for each of the respective color components;

a reading step, of reading, from a table in which lattice point data corresponding to plural representative input values have been stored, the plural lattice point data corresponding to the upper N bits; and according to the plural one bits output in said quantization step, performing only an addition process and a bit shift operation from the plural lattice point data to calculate the output image data.

8. A computer-readable storage medium which stores a program to execute an image processing method for use with an image processing apparatus that calculates output color image data from input color image data by using a table, the method comprising:

a quantization step, of quantizing respective color components constituting the input color image data and outputting upper N bits and upper (N+1)th bit for each of the respective color components;

a reading step, of reading, from a table in which lattice point data corresponding to plural representative input values have been stored, the plural lattice point data corresponding to the upper N bits; and according to the plural one bits output in said quantization step, performing only an addition process and a bit shift operation from the plural lattice point data to calculate the output image data.

9. An image processing method for entering input pixels of image information composed of plural color components with n gradation levels in each color component and effecting a conversion into output pixels of image information of which a number of pixels is increased to (A×B) times that of the plural color components, matching color reproduction characteristics of an image output device, comprising:

a quantizing step of quantizing each of the color components of the input information to eliminate lower bits of each color component using a plurality of quantization points;

a table preparing step of preparing a conversion table for converting each quantization point into a respective correction value matching the color reproduction characteristics of the image output device, wherein each correction value may have one of n gradation levels;

a determination step of determining, for each of the input pixels, a number of generated outout pixels corresponding to each of the quantization points to be generated as ones of the (A×B) pixels, based on information of the lower bits of each color component eliminated by said quantization step, so that each of the (A×B) pixels has a value equal to the correction value for the corresponding quantization point;

a gradation process step of reducing a number of gradation levels of the output pixels corresponding to the correction values, released from said conversion table, to m levels (m<n) by a pseudo gradation process, based on the numbers of generated pixels determined by said determination step; and a disposition step of positioning the generated output pixels of m gradation levels after processing, as the (A×B) pixels of the output image information.

10. A recording medium storing a program for executing the steps according to claim 9.

* * * * *

UNITED STATES PATENT AND TRADEMARK OFFICE
CERTIFICATE OF CORRECTION

PATENT NO. : 6,415,065 B1  
DATED : July 2, 2002  
INVENTOR(S) : Miyake

It is certified that error appears in the above-identified patent and that said Letters Patent is hereby corrected as shown below:

Column 8,
Line 28, "these" should read -- this --.

Column 9,
Line 28, "method," should read -- methods, --; and
Line 41, "method," should read -- methods --.

Column 12,
Line 13, "substantially" should read -- substantial --.

Signed and Sealed this

Twenty-second Day of April, 2003

JAMES E. ROGAN
*Director of the United States Patent and Trademark Office*